United States Patent
Buhlmann et al.

(10) Patent No.: US 10,083,539 B2
(45) Date of Patent: Sep. 25, 2018

(54) CONTROL SYSTEM FOR NAVIGATION IN VIRTUAL REALITY ENVIRONMENT

(71) Applicant: Google Inc., Mountain View, CA (US)

(72) Inventors: Matthias Buhlmann, Mountain View, CA (US); Dominik Philemon Kaeser, Mountain View, CA (US); Chun-Po Wang, Mountain View, CA (US); Matthew Seegmiller, Mountain View, CA (US); Evan Hardesty Parker, Los Altos, CA (US)

(73) Assignee: Google LLC, Mountain View, CA (US)

( * ) Notice: Subject to any disclaimer, the term of this patent is extended or adjusted under 35 U.S.C. 154(b) by 30 days.

(21) Appl. No.: 15/352,162

(22) Filed: Nov. 15, 2016

(65) Prior Publication Data

US 2017/0228921 A1    Aug. 10, 2017

Related U.S. Application Data

(60) Provisional application No. 62/292,602, filed on Feb. 8, 2016.

(51) Int. Cl.

| G06F 3/033 | (2013.01) |
| G06F 3/0481 | (2013.01) |
| G06F 3/0484 | (2013.01) |
| G06T 15/20 | (2011.01) |
| G06T 19/00 | (2011.01) |
| G06T 3/20 | (2006.01) |
| G06T 3/40 | (2006.01) |

(Continued)

(52) U.S. Cl.
CPC .............. *G06T 15/20* (2013.01); *G06F 1/163* (2013.01); *G06F 3/012* (2013.01); *G06F 3/013* (2013.01); *G06F 3/014* (2013.01); *G06F 3/017* (2013.01); *G06F 3/033* (2013.01); *G06F 3/0304* (2013.01); *G06F 3/0486* (2013.01); *G06F 3/04815* (2013.01); *G06F 3/04842* (2013.01); *G06F 3/04845* (2013.01); *G06T 3/20* (2013.01); *G06T 3/40* (2013.01); *G06T 19/003* (2013.01); *G06T 19/006* (2013.01); *G06F 2203/0384* (2013.01); *G06F 2203/04806* (2013.01); *G06T 2210/21* (2013.01)

(58) Field of Classification Search
None
See application file for complete search history.

(56) References Cited

U.S. PATENT DOCUMENTS

| 7,646,394 B1 | 1/2010 | Neely et al. |
| 2016/0004300 A1 | 1/2016 | Baic |
| 2016/0291687 A1* | 10/2016 | Kasahara .............. G06F 3/0488 |

OTHER PUBLICATIONS

International Search Report and Written Opinion for PCT Application No. PCT/US2016/65058, dated Mar. 1, 2017, 10 pages.

(Continued)

*Primary Examiner* — Yingchun He
(74) *Attorney, Agent, or Firm* — Brake Hughes Bellermann LLP

(57) ABSTRACT

In a control system for navigating in a virtual reality environment, a user may select a virtual feature in the virtual environment, and set an anchor point on the selected feature. The user may then move, or adjust position, relative to the feature, and/or move and/or scale the feature in the virtual environment, maintaining the portions of the feature at the set anchor point within the user's field of view of the virtual environment.

20 Claims, 20 Drawing Sheets

(51) Int. Cl.
*G06F 1/16* (2006.01)
*G06F 3/01* (2006.01)
*G06F 3/03* (2006.01)
*G06F 3/0486* (2013.01)

(56) References Cited

OTHER PUBLICATIONS

Pfeiffer, "Classic 3D User Interaction Techniques for Immersive Virtual Reality Revisited", retrieved on Feb. 14, 2017 from https://www.youtube.com/watch?v=KaNE4946LDk, Jan. 25, 2010, 1 page.

* cited by examiner

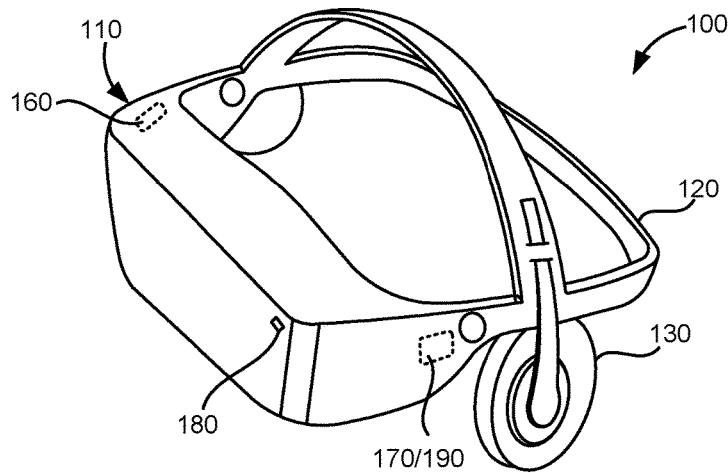
FIG. 2A
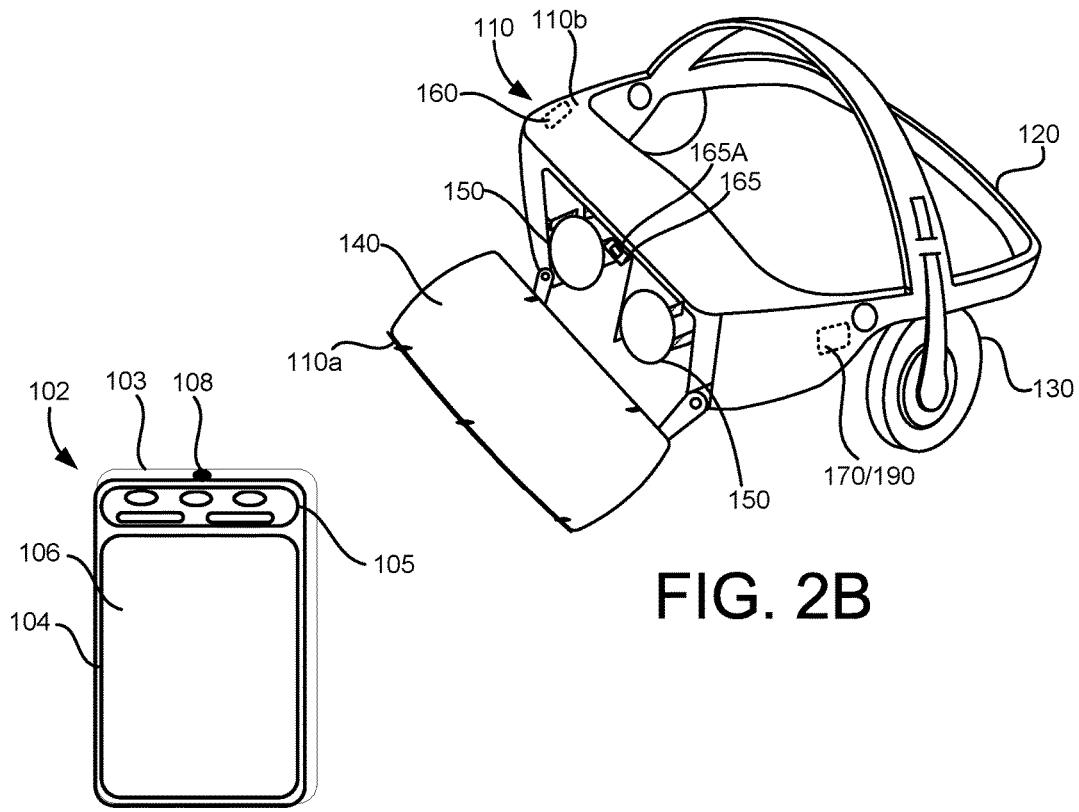
FIG. 2B
FIG. 2C

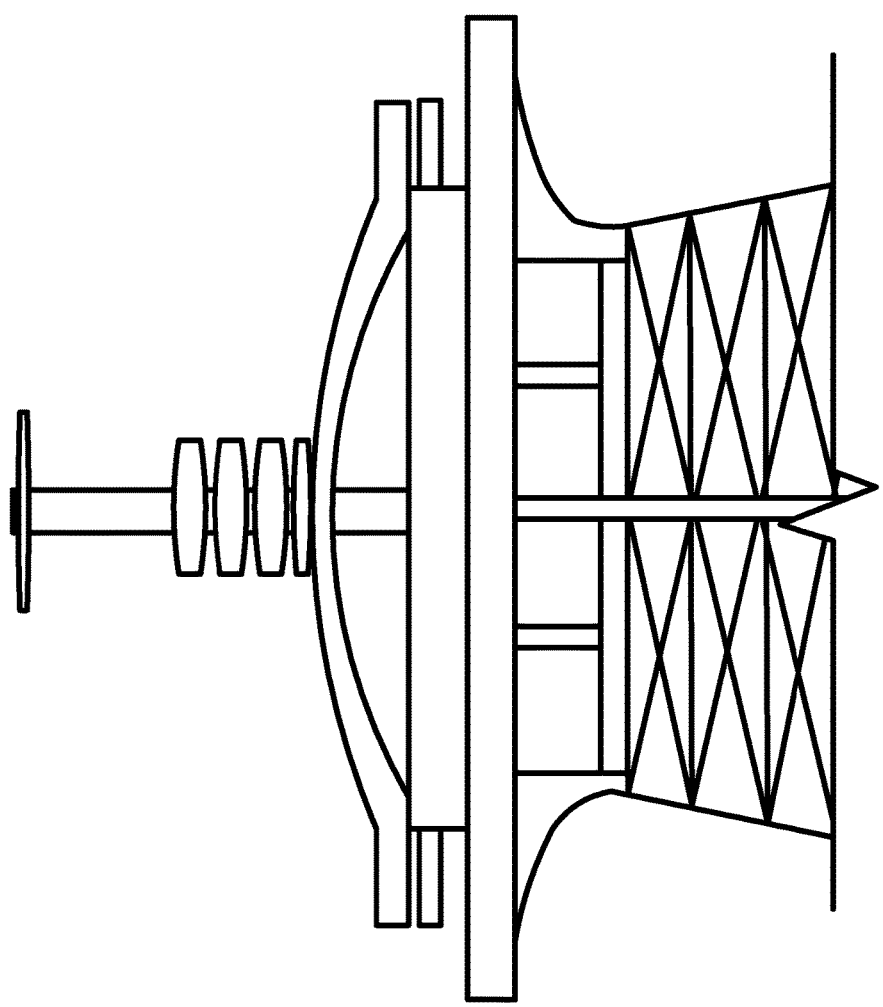

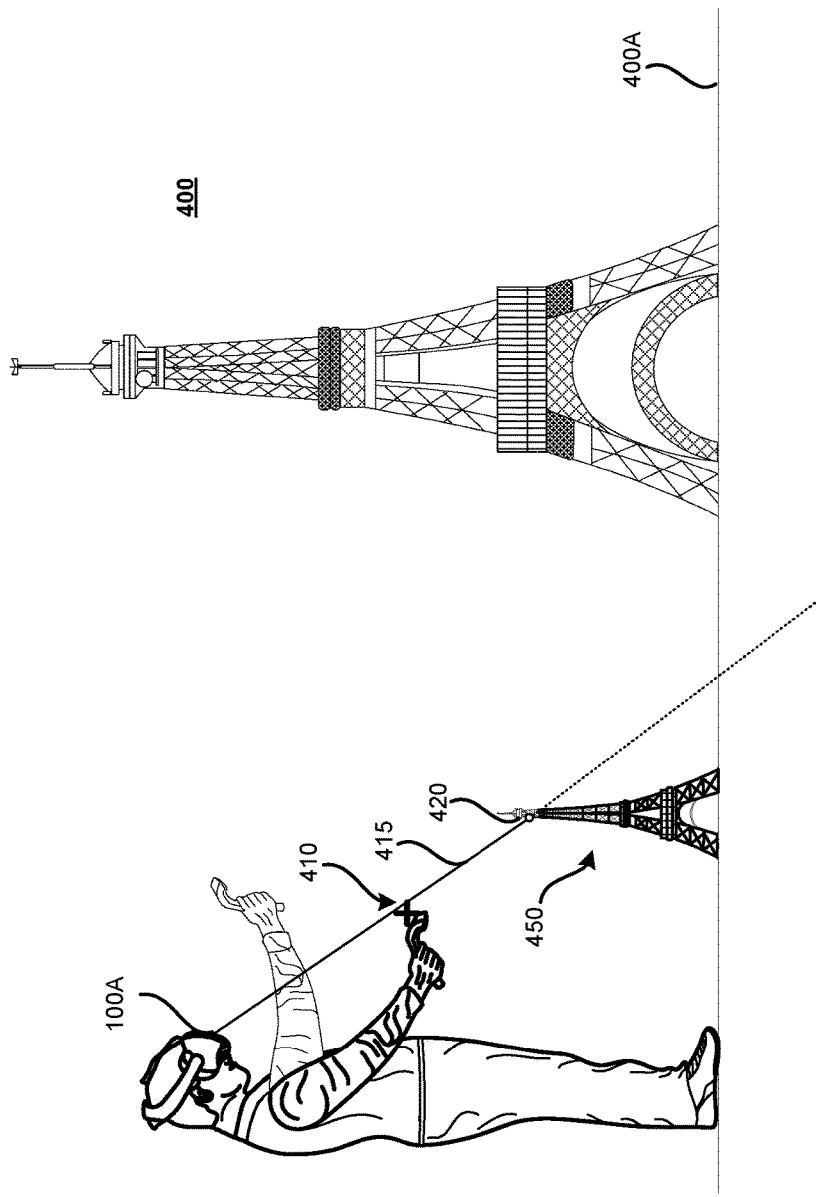

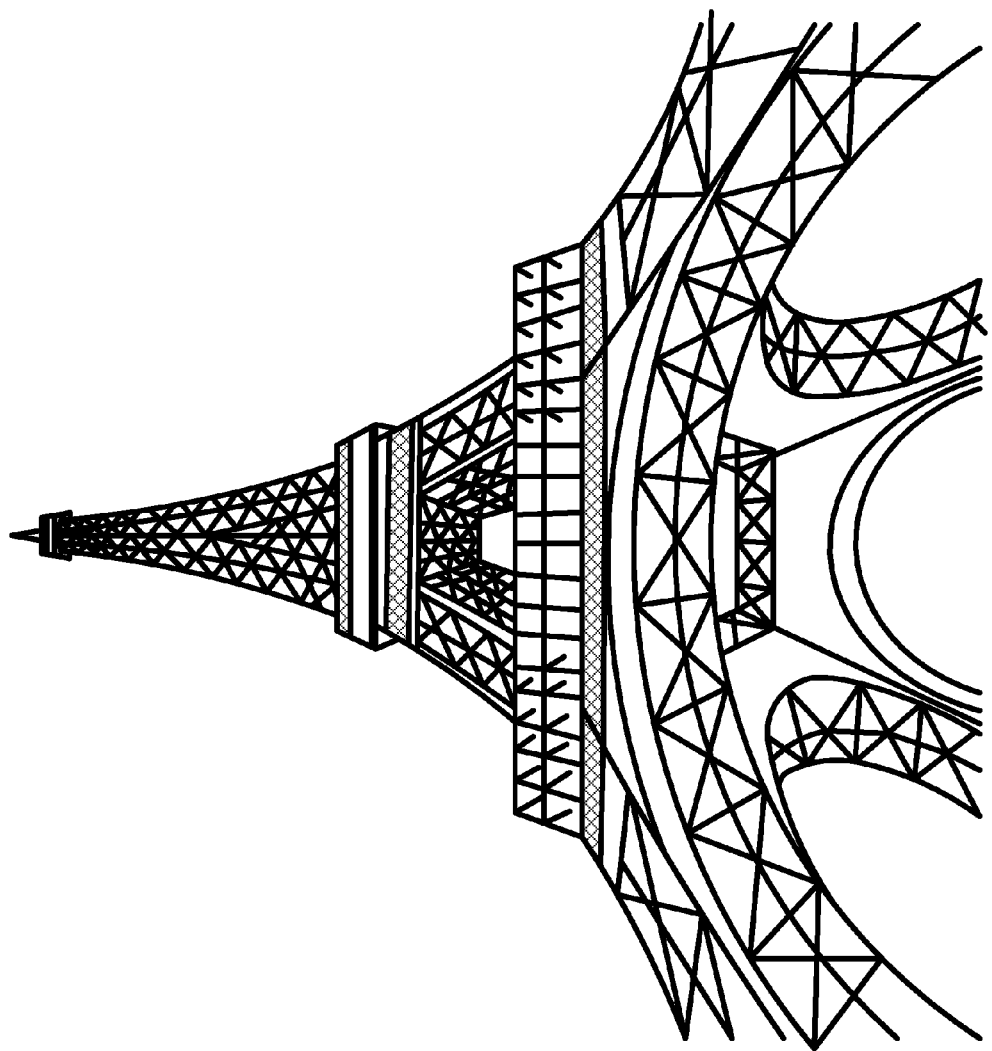

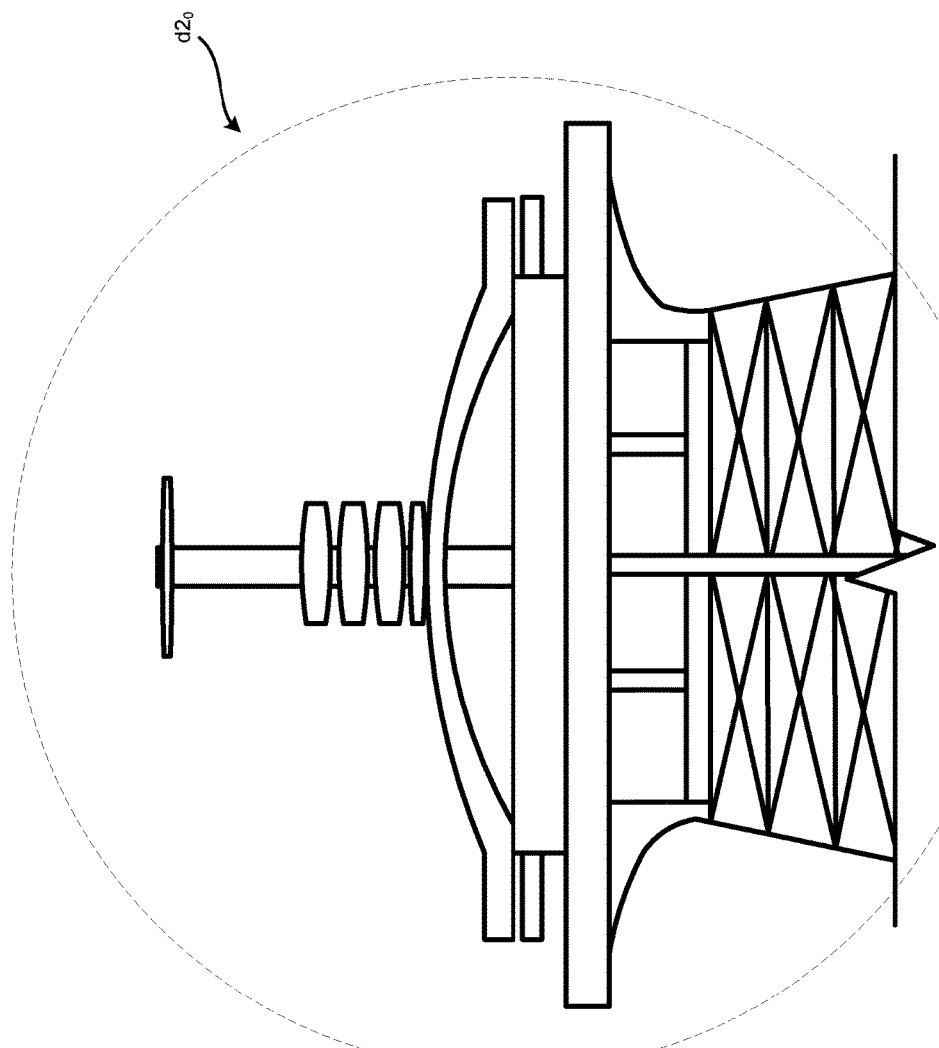

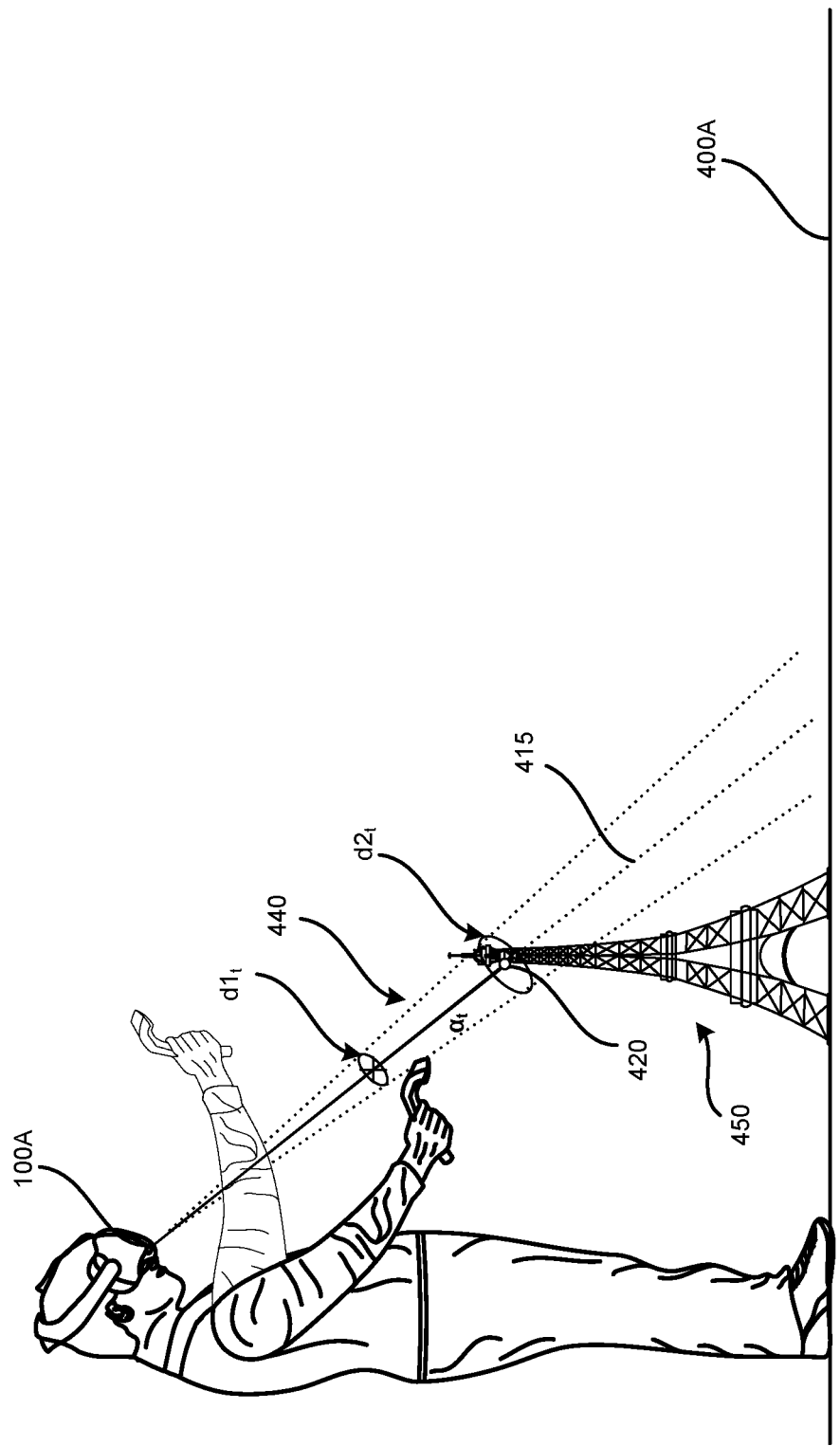

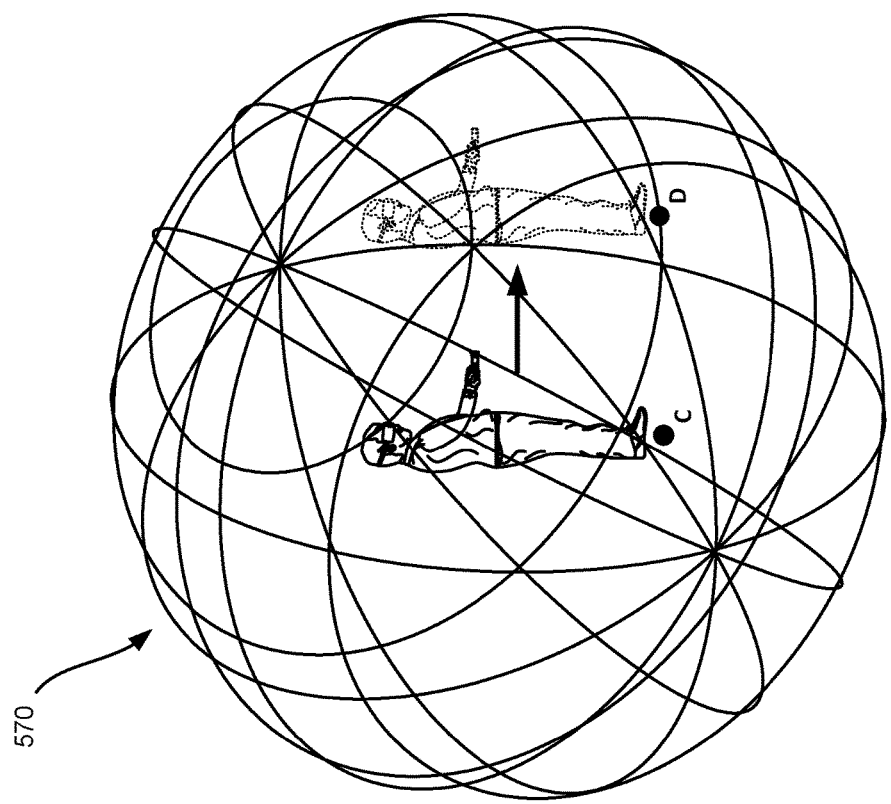

CONTROL SYSTEM FOR NAVIGATION IN VIRTUAL REALITY ENVIRONMENT

CROSS-REFERENCE TO RELATED APPLICATION

This application is a Nonprovisional of, and claims priority to, U.S. Patent Application No. 62/292,602, filed on Feb. 8, 2016, entitled "CONTROL SYSTEM FOR NAVIGATION IN VIRTUAL REALITY ENVIRONMENT", which is incorporated by reference herein in its entirety.

FIELD

This application relates, generally, to movement and scaling in an augmented reality and/or a virtual reality environment.

BACKGROUND

An augmented reality (AR) and/or a virtual reality (VR) system may generate a three-dimensional (3D) immersive virtual environment. A user may experience this 3D immersive virtual environment through interaction with various electronic devices, such as, for example, a helmet or other head mounted device including a display, glasses or goggles that a user looks through when viewing a display device, gloves fitted with sensors, external handheld devices that include sensors, and other such electronic devices. Once immersed in the 3D virtual environment, the user may move through the virtual environment and move to other areas of the virtual environment, through physical movement and/or manipulation of an electronic device to interact with the virtual environment and personalize interaction with the virtual environment.

SUMMARY

In one aspect, a method may include generating a virtual environment, detecting a first input at a user interface of a controller in communication with a head mounted display device, setting an anchor point on a selected virtual feature in the virtual environment in response to the first input, detecting a second input, and, in response to the second input, defining an area of the feature surrounding the anchor point, and adjusting at least one of a position or a scale of the virtual feature in the virtual environment, while maintaining a portion of the virtual feature within the defined area within a user field of view of the virtual environment In another aspect, a system may include a computing device configured to generate an immersive virtual environment, the computing device a memory storing executable instructions, and a processor configured to execute the instructions. The processor may cause the computing device to generate a virtual environment, detect a first input at a user interface of a controller in communication with a head mounted display device, set an anchor point on a selected virtual feature in the virtual environment in response to the first input, detect a second input, and, in response to the second input, define an area of the feature surrounding the anchor point, and adjust at least one of a position or a scale of the virtual feature in the virtual environment, while maintaining a portion of the virtual feature within the defined area within a user field of view of the virtual environment.

The details of one or more implementations are set forth in the accompanying drawings and the description below. Other features will be apparent from the description and drawings, and from the claims.

BRIEF DESCRIPTION OF THE DRAWINGS

FIGS. 2A and 2B are perspective views of an example head mounted display, and FIG. 2C illustrates a controller, in accordance with implementations described herein.

FIGS. 4A-4F, 5, and 6A-6F are third person views illustrating navigation and scaling in an augmented and/or virtual reality environment, in accordance with implementations described herein.

FIGS. 7A and 7B illustrate movement in a virtual photo sphere in an augmented and/or virtual reality environment, in accordance with implementations described herein.

DETAILED DESCRIPTION

A user immersed in a 3D virtual environment wearing, for example, a head mounted display (HMD) device may explore the 3D virtual environment and interact with the 3D virtual environment through various different types of inputs. These inputs may include, for example, physical interaction including, for example, manipulation of an electronic device separate from the HMD, manipulation of the HMD itself, and/or through hand/arm gestures, head movement and/or head and/or eye directional gaze and the like. A user may implement one or more of these different types of interactions to execute a particular action in the virtual environment, such as, for example, moving through the virtual environment or moving the virtual environment relative to the user, moving, or transitioning, or teleporting, from a first area of the virtual environment to a second area of the virtual environment, adjusting a perspective through which the virtual environment is experienced, and the like.

A system and method, in accordance with implementations described herein, may facilitate manipulation of features in the virtual environment, and may facilitate movement, or navigation, through the virtual environment, and may allow the user to view and experience the virtual environment from different perspectives and scales. A system and method, in accordance with implementations described herein, may also provide the user with a substantially seamless virtual movement experience in virtual reality, while avoiding the motion sickness and disorientation sometimes associated with a disconnect between the dynamic visual movement experienced in virtual reality and the lack of actual, physical motion corresponding to the dynamic visual movement.

Figure 1:
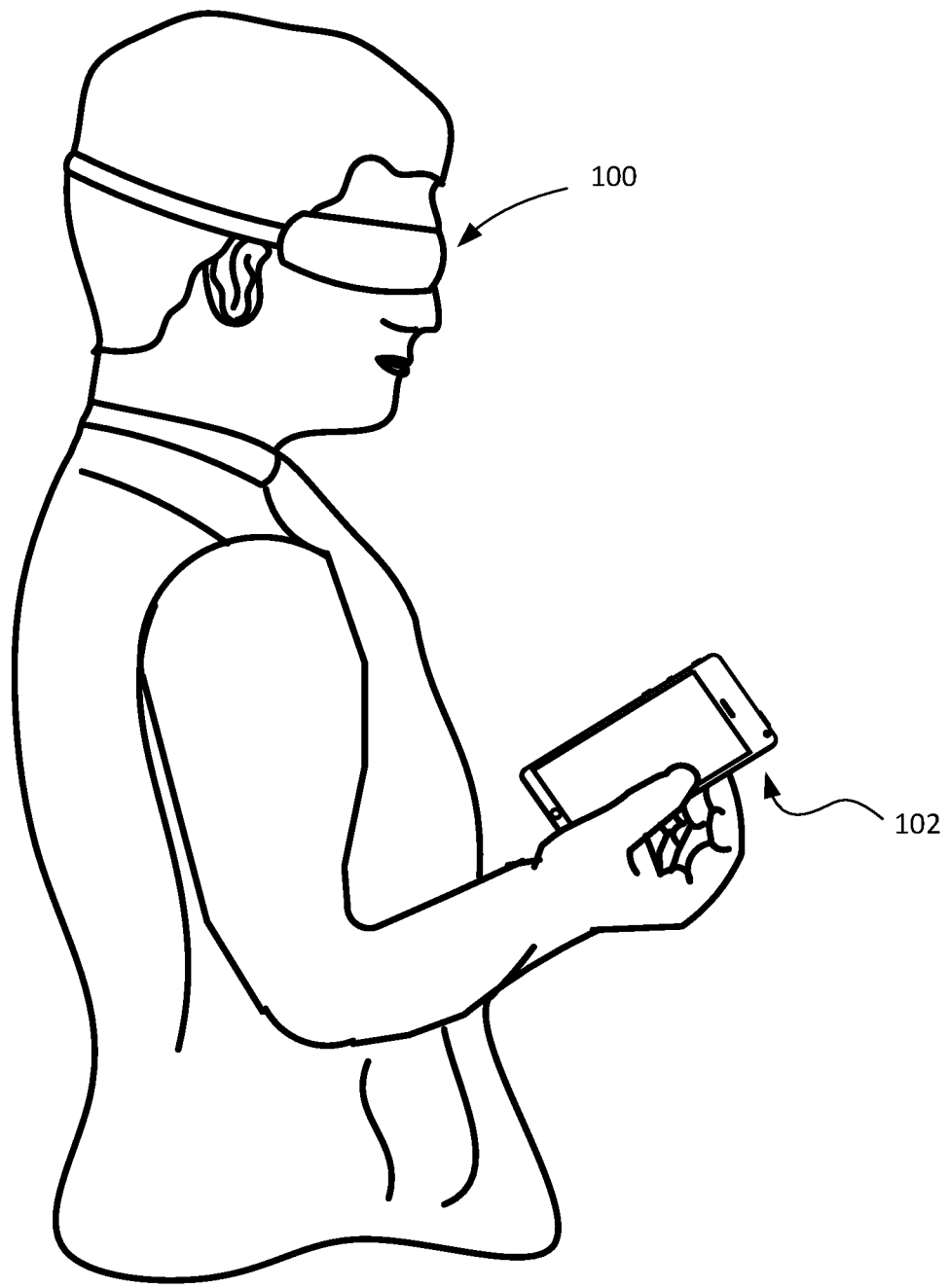
FIG. 1 is an example implementation of a virtual reality system including a head mounted display device and a controller, in accordance with implementations described herein.

In the example implementation shown in FIG. 1, a user wearing an HMD 100 is holding a handheld electronic device 102. The handheld electronic device 102 may be, for example, a controller, a gyromouse, a smartphone, a joystick, or another portable controller(s) that may be paired with, and communicate with, the HMD 100 for interaction in the immersive virtual environment generated by the HMD 100. Hereinafter, simply for ease of discussion and illustration, the handheld electronic device 102 will be referred to as a controller 102. The controller 102 may be operably coupled with, or paired with the HMD 100 via, for example, a wired connection, or a wireless connection such as, for example, a WiFi or Bluetooth connection. This pairing, or operable coupling, of the controller 102 and the HMD 100 may provide for communication between the controller 102 and the HMD 100 and the exchange of data between the controller 102 and the HMD 100. This may allow the controller 102 to function as a controller in communication with the HMD 100 for interacting in the immersive virtual environment generated by the HMD 100. That is, the controller 102 may be manipulated in a plurality of different manners. Manipulation of the controller 102 may be translated into a corresponding selection, or movement, or other type of interaction, in the immersive virtual environment generated by the HMD 100. This may include, for example, an interaction with, manipulation of, or adjustment of a virtual object, a change in scale or perspective with respect to the virtual environment, a movement (e.g., navigation, teleportation, transport) of the user from a current location in the virtual environment to a selected destination or feature in the virtual environment, and other such interactions. In some implementations, as discussed above, the user may interact with virtual features in the virtual environment through physical gestures, such as hand gestures, detected by a system equipped to detect and track the user's hands, without relying on the use of a separate controller.

FIGS. 2A and 2B are perspective views of an example HMD, such as, for example, the HMD 100 worn by the user in FIG. 1, and FIG. 2C illustrates an example controller, such as, for example, the controller 102 shown in FIG. 1.

The controller 102 may include a housing 103 in which internal components of the device 102 are received, and a user interface 104 on an outside of the housing 103, accessible to the user. The user interface 104 may include a plurality of different types of manipulation devices, including, for example, a touch sensitive surface 106 configured to receive user touch inputs, manipulation devices 105 including buttons, knobs, joysticks, toggles, slides and other such manipulation devices. In some implementations, the controller 102 may also include a light source 108 configured to selectively emit light, for example, a beam or ray, through a port in the housing 103, for example, in response to a user input received at the user interface 104.

The HMD 100 may include a housing 110 coupled to a frame 120, with an audio output device 130 including, for example, speakers mounted in headphones, also be coupled to the frame 120. In FIG. 2B, a front portion 110*a* of the housing 110 is rotated away from a base portion 110*b* of the housing 110 so that some of the components received in the housing 110 are visible. A display 140 may be mounted on an interior facing side of the front portion 110*a* of the housing 110. Lenses 150 may be mounted in the housing 110, between the user's eyes and the display 140 when the front portion 110*a* is in the closed position against the base portion 110*b* of the housing 110. In some implementations, the HMD 100 may include a sensing system 160 including various sensors such as, for example, audio sensor(s), image/light sensor(s), positional sensors (e.g., inertial measurement unit including gyroscope and accelerometer), and the like. The HMD 100 may also include a control system 170 including a processor 190 and various control system devices to facilitate operation of the HMD 100.

In some implementations, the HMD 100 may include a camera 180 to capture still and moving images. The images captured by the camera 180 may be used to help track a physical position of the user and/or the controller 102 in the real world, and/or may be displayed to the user on the display 140 in a pass through mode, allowing the user to temporarily leave the virtual environment and return to the physical environment without removing the HMD 100 or otherwise changing the configuration of the HMD 100 to move the housing 110 out of the line of sight of the user.

In some implementations, the HMD 100 may include a gaze tracking device 165 to detect and track an eye gaze of the user. The gaze tracking device 165 may include, for example, an image sensor 165A, or multiple image sensors 165A, to capture images of the user's eyes, for example, a particular portion of the user's eyes, such as, for example, the pupil, to detect, and track direction and movement of, the user's gaze. In some implementations, the HMD 100 may be configured so that the detected gaze is processed as a user input to be translated into a corresponding interaction in the immersive virtual experience.

Figure 3:
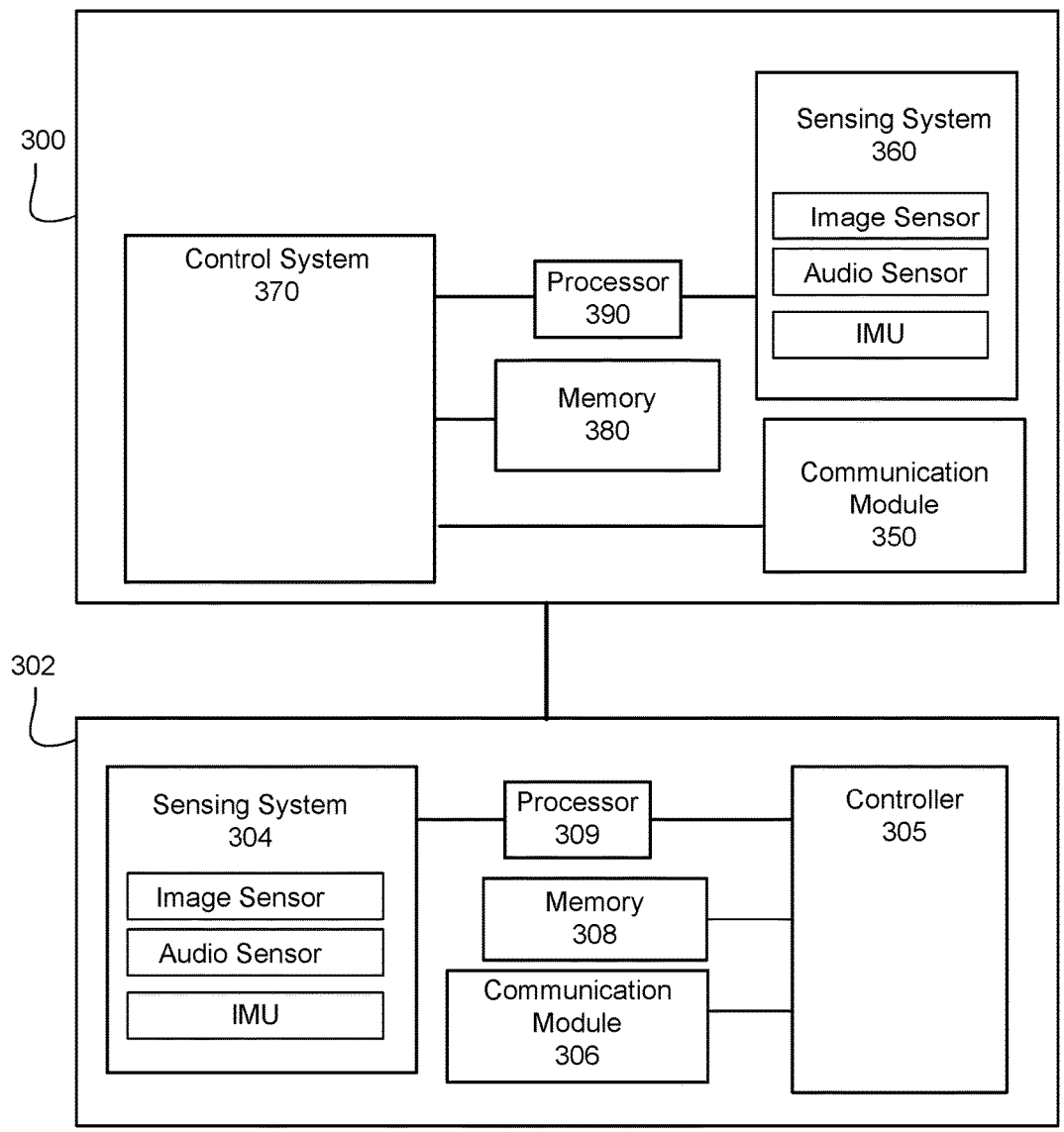
FIG. 3 is a block diagram of a head mounted electronic device and a controller, in accordance with implementations described herein.

A block diagram of a system providing for manipulation and control of navigation in an augmented and/or virtual reality environment is shown in FIG. 3. The system may include a first electronic device 300 in communication with a second electronic device 302. The first electronic device 300 may be, for example an HMD as described above with respect to FIGS. 1, 2A and 2B, generating an immersive virtual environment, and the second electronic device 302 may be, for example, a controller as described above with respect to FIGS. 1 and 2C, that is in communication with the first electronic device 300 to facilitate user interaction with the immersive virtual environment generated by the first electronic device 300.

The first electronic device 300 may include a sensing system 360 and a control system 370, which may be similar to the sensing system 160 and the control system 170, respectively, shown in FIGS. 2A and 2B. The sensing system 360 may include one or more different types of sensors, including, for example, a light sensor, an audio sensor, an image sensor, a distance/proximity sensor, a positional sensor (e.g., an inertial measurement unit including a gyroscope and accelerometer) and/or other sensors and/or different combination(s) of sensors, including, for example, an image sensor positioned to detect and track the user's eye gaze, such as the gaze tracking device 165 shown in FIG. 2B. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370, a memory 380, and a communication module 350 providing for communication between the first electronic device 300 and another, external device, such as, for example, the second electronic device 302.

The second electronic device 302 may include a communication module 306 providing for communication between the second electronic device 302 and another, external device, such as, for example, the first electronic device 300.

In addition to providing for the exchange of data between the first electronic device 300 and the second electronic device 302, the communication module 306 may also be configured to emit a ray or beam as described above. The second electronic device 302 may include a sensing system 304 including an image sensor and an audio sensor, such as is included in, for example, a camera and microphone, an inertial measurement unit, a touch sensor such as is included in a touch sensitive surface of a controller, or smartphone, and other such sensors and/or different combination(s) of sensors. A processor 309 may be in communication with the sensing system 304 and a control unit 305 of the second electronic device 302, the control unit 305 having access to a memory 308 and controlling overall operation of the second electronic device 302.

As noted above, a controller, such as, for example, the controller 102 described above, may be manipulated by a user, sometimes in combination with the functionality of the HMD 100 described above, for interaction and navigation in the virtual environment. An example implementation of this is shown in FIGS. 4A-4E.

Figure 4A:
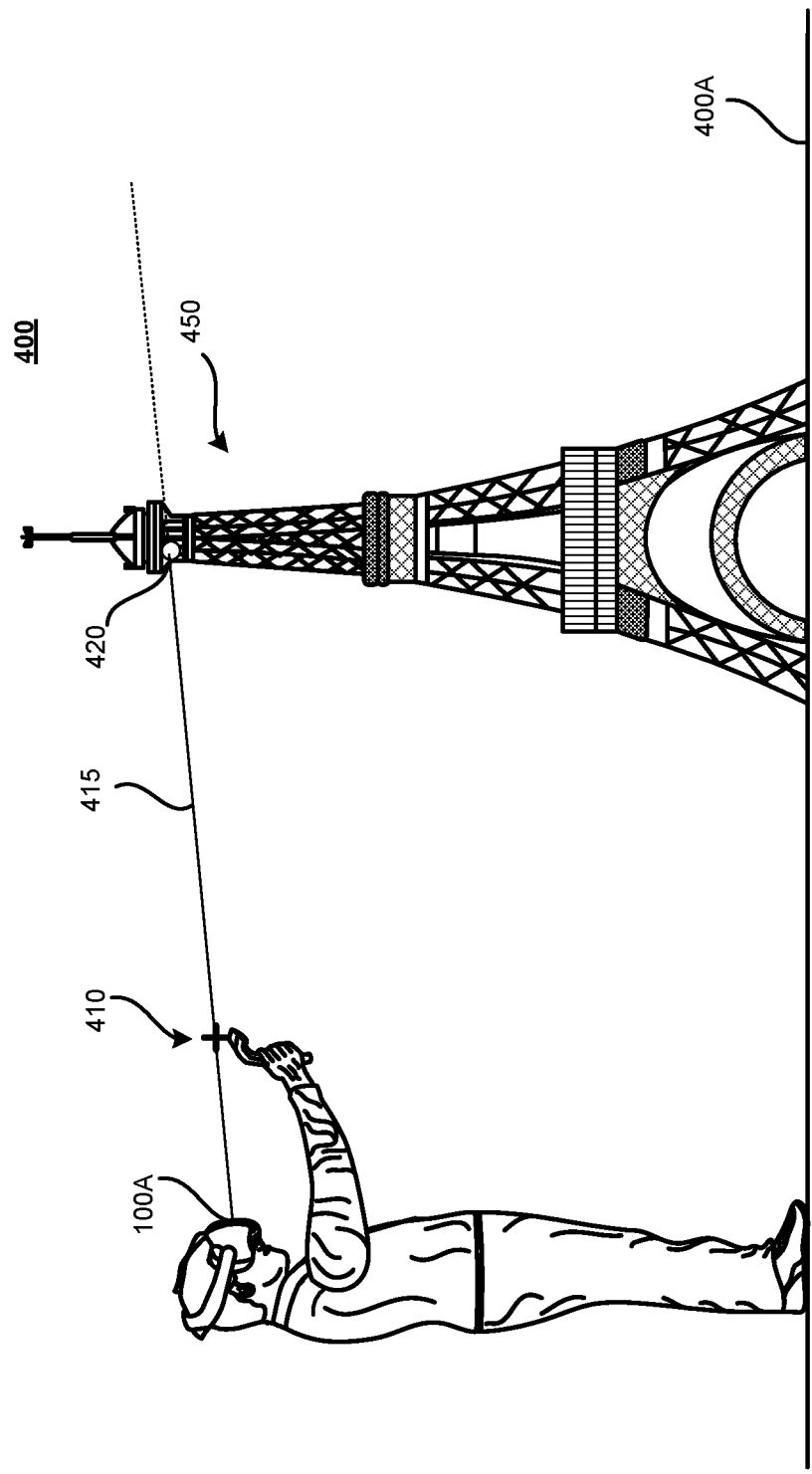

A user, wearing an HMD 100 that generates a virtual environment to be experienced by the user, may operate a controller 102 to navigate and manipulate virtual objects and virtual features in the virtual environment 400. As shown in FIG. 4A, a fixed, set controller reference point 410, which may remain fixed relative to the controller 102 as the controller 102 moves, may be associated with the controller 102. Hereinafter, simply for ease of discussion and illustration, the set controller reference point 410 will be illustrated in the drawings as a set of virtual crosshairs, with the set controller reference point 410 at the intersection of the pair of virtual crosshairs. The set controller reference point 410/virtual crosshairs 410 may remain in a fixed position with respect to the controller 102, moving together with the controller 102 as the user moves the controller 102 relative to virtual objects and features in the virtual environment 400. In the example shown in FIG. 4A, the virtual crosshairs 410 include a visual representation, or icon, that remains in a fixed position relative to the controller 102, and essentially moves together with the controller 102. The virtual crosshairs 410 will be represented in this manner hereinafter, simply for ease of discussion and illustration. However, in some implementations, the virtual crosshairs 410 may represent a known position in space (known by the controller 102 and/or the HMD 100) relative to the controller 102, but not be rendered in the form of a visual representation, or icon, to the user, so that the user's view of and access to the virtual objects and features in the virtual environment 400 are not obscured by a visual representation of the virtual crosshairs 410.

FIG. 4A illustrates the start of a user's virtual interaction with a virtual feature 450, with the virtual feature 450 shown as it is viewed by the user at the start of the virtual interaction. As shown in FIG. 4A, at the start of a user's interaction with the virtual feature 450 in the virtual environment 400, for example, at a time t=0, the user may define an anchor point 420 associated with the virtual feature 450. In FIG. 4A, The anchor point 420 may identify, for example, a portion of the virtual feature 450 which the user wishes to remain within his field of view as the user moves and/or changes position and/or perspective relative to the virtual objects and features in the virtual environment 400. At the start of the user's interaction with the virtual feature 450, or time t=0, the anchor point 420 may be defined by a virtual target ray 415 extending from a set user reference point 100A, through the virtual crosshairs 410, and intersecting with the selected portion of the virtual feature 450 as defined by the direction of the virtual target ray 415 which may be controlled by the user moving the reference point 100A and/or the virtual crosshairs 410.

The user reference point 100A may be defined at a set location on the HMD 100, for example, a position at or near the user's eyes, a position corresponding to a location between the user's eyes, or other set position. This set user reference point 100A may remain set, or constant, on or relative to the HMD 100, as the user, and in particular, the user's head, moves and changes position/orientation in the virtual environment 400. Similarly, the location/position/orientation of the virtual crosshairs 410 relative to the controller 102 may remain set, or at a constant position on or relative to the controller 102, as the user, and in particular, the user's arm/hand holding the device 102, change location/position/orientation in the virtual environment. The location and position/orientation of the HMD 100 and location and position/orientation of the controller 102 relative to the HMD 100 may be known and tracked, substantially in real time, by the system, and the constant location of the set user reference point 100A and the constant location of the virtual crosshairs 410 relative to the controller 102 may also be known and tracked, substantially in real time.

In the example shown in FIG. 4A, the virtual target ray 415, extending from the set user reference point 100A, through the virtual crosshairs 410 to the selected anchor point 420, is represented by a dotted line. However, in some implementations, the virtual target ray 415 is not necessarily rendered as a visual representation or object to be viewed by the user, so that the user's view of and access to the virtual objects and features in the virtual environment are not obscured by the visual representation of the virtual target ray 420. In some implementations, a visual indicator, for example, a dot, may be rendered at the point on the virtual feature 450 identified by the virtual target ray 415 to be the anchor point 420. An example of the user's view, or perspective, from the user's virtual position relative to the virtual feature 450 shown in FIG. 4A, as the user sets the anchor point 420, is shown in FIG. 4B. The arrangement shown in FIG. 4A may represent the start of the user's interaction with the virtual feature 450, or time t=0, by, for example, manipulating a device on the user interface 104 of the controller 102, such as, for example, depressing a button or trigger.

Figure 4D:
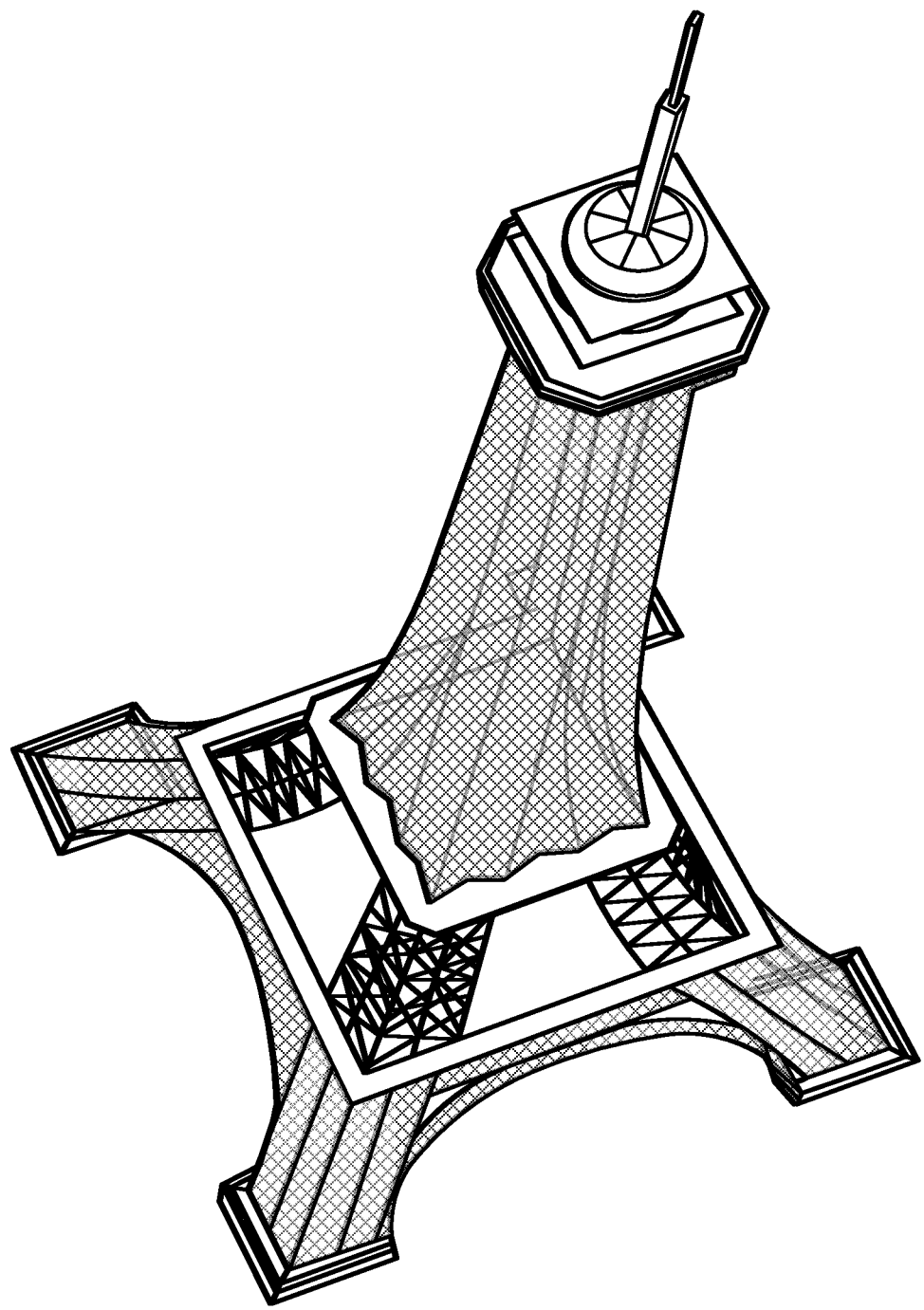

Depression of the button or trigger (or actuation of other manipulation device on the user interface 104 of the controller 102) may be used to identify and set the anchor point 420, as shown in FIG. 4A. After setting the anchor point 420, user movement, for example, head and hand/arm movement, and corresponding movement of the virtual target ray 415 extending through the virtual crosshairs 410 to the anchor point 420 (due to movement of the set user reference point 100A on the user's head and movement of the controller 102 held in the user's hand) may cause the feature 450 to be translated and scaled in the virtual environment 400. For example, once the anchor point 420 is set as described above, a downward movement of the virtual target ray 415 as shown in FIG. 4C (from the position shown in FIG. 4A, while the button or trigger remains depressed) may cause a downward translation of the anchor point 420, resulting in a change in scale of the virtual environment 400 (as the user's feet remain on the virtual ground, and the virtual feature 450 remains on the virtual ground), and in particular, a change in scale of the virtual feature 450 in the virtual environment 400 anchored by the anchor point 420, and the user's view or perspective relative to the virtual feature 450, as shown in FIG. 4D.

Figure 4E:
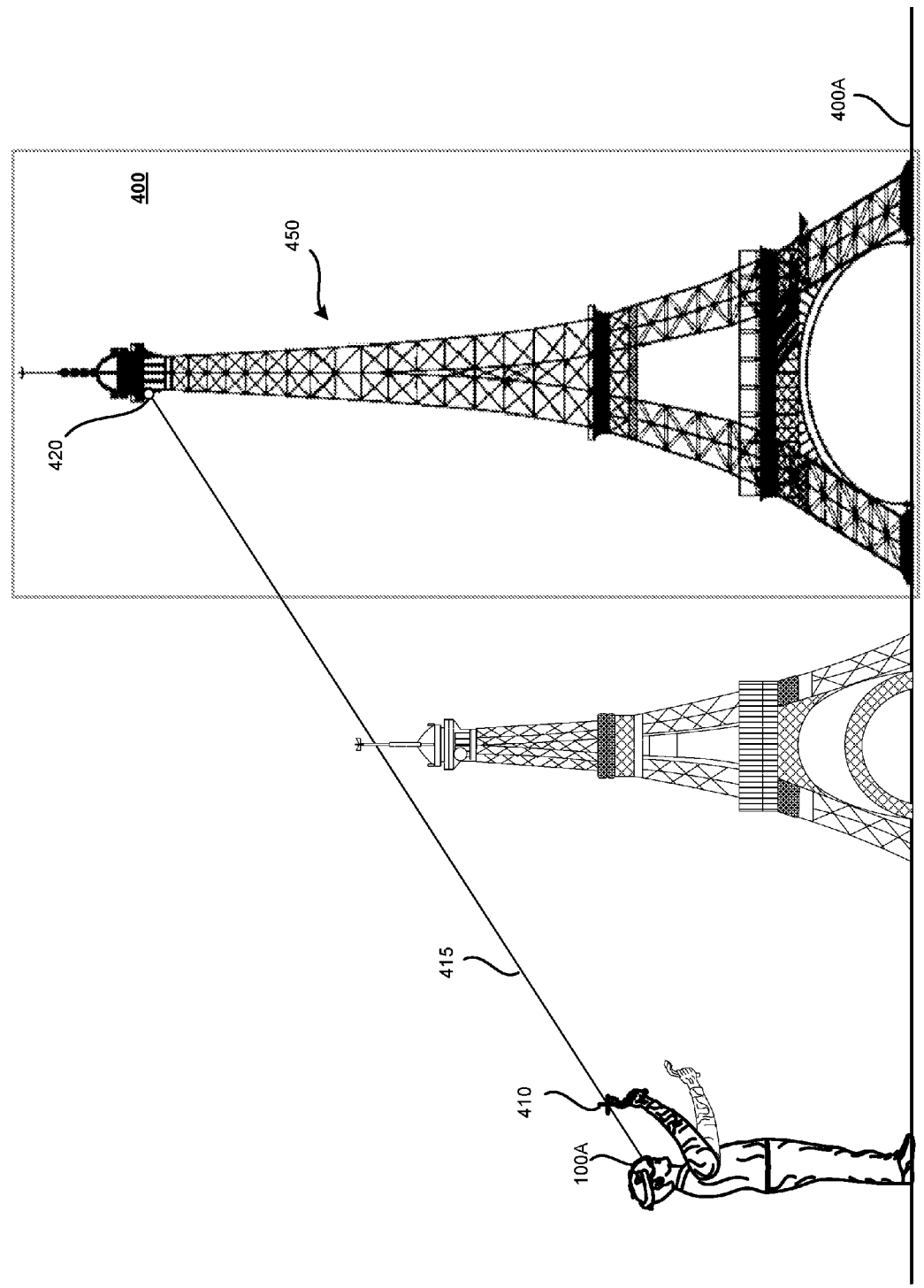

Similarly, once the anchor point 420 is set as described above, an upward movement of the virtual target ray 415 as shown in FIG. 4E (for example, from the position shown in FIG. 4A, while the button or trigger remains depressed) may cause an upward translation of the anchor point 420, resulting in a change in scale of the virtual environment 400, and in particular, a change in scale, or perspective of the user relative to the virtual feature 450 in the virtual environment 400 anchored by the anchor point 420, and the user's view or perspective relative to the feature, as shown in FIG. 4F.

Adjusting scale in a virtual environment may be a change (an increase or a decrease) in the user's size relative to the virtual features in the virtual environment, or a corresponding change in the user's perspective relative to the virtual features in the virtual environment (or, may be considered a change, i.e., an increase or a decrease, in a size of the virtual features in the virtual environment relative to the user). For example, the user may choose to scale up so that, from the user's perspective, the user experiences the virtual environment as though his size has increased relative to the virtual features in the virtual environment (and/or the virtual features appear to have decreased in size/scale). Similarly, the user may choose to scale down, so that, from the user's perspective, the user experiences the virtual environment as though his size has decreased relative to the virtual features in the virtual environment (and/or the virtual features appear to have increased in size/scale). This type of scaling in the virtual environment may be considered a virtual adjustment in size/scaling of the user, in particular the user's perspective relative to the virtual features in the virtual environment, or a virtual adjustment in size/scaling of the virtual features in the virtual environment relative to the user. Hereinafter, simply for ease of discussion, scaling will be considered to include a virtual adjustment of the user's size/scale relative to the virtual features and/or a virtual adjustment of the size/scale of the virtual features in the virtual environment. The movement from the position shown in FIG. 4A (illustrated in dotted lines, as a ghosted image in FIG. 4C) to the position shown in FIG. 4C, and/or from the position shown in FIG. 4A (illustrated in dotted lines, as a ghosted image shown in FIG. 4E) to the position shown in FIG. 4E, illustrate exemplary upward and downward movements, and corresponding translation of the virtual feature 450 in the virtual environment 400 and/or scaling of the user relative to the virtual environment 400 (or scaling of the virtual environment 400 relative to the user). However, movements in other directions (while the button or trigger remains depressed) may also cause the anchor point 420 to remain anchored to the identified portion of the selected virtual feature 450 through the corresponding movement. For example, a movement to the right may generate an effect of the virtual feature 450 moving around, or orbiting around, the user. Similarly, a movement of the user's arm closer to the user may generate an effect of zooming in closer to the virtual feature 450.

Figure 5:
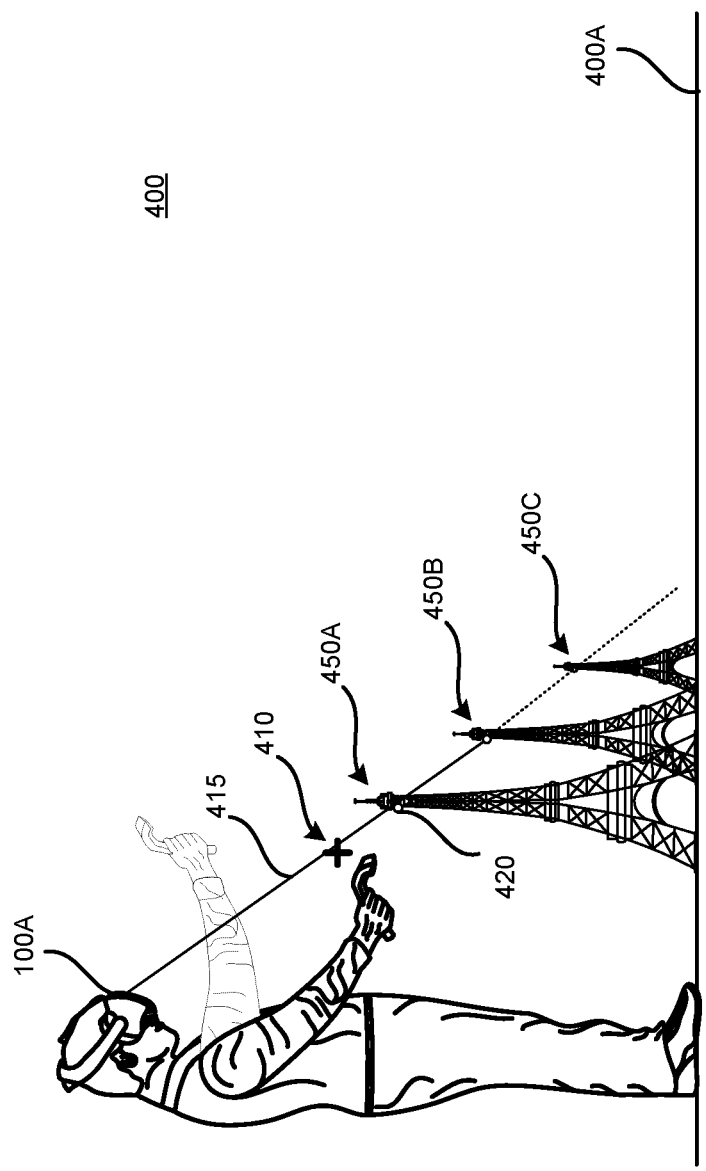

In response to certain movements, the system may rely on certain fixed parameters associated with the set user reference point, the position of the virtual crosshairs 410 relative to the controller 102 and a set virtual reference point 400A, the set virtual reference point 400A remaining substantially stationary and unchanging throughout the various movements and/or translation of features and/or scaling as described above. Hereinafter, the set virtual reference point 400A will be a reference plane corresponding to the virtual ground, or virtual floor, in the virtual environment 400. That is, as illustrated in the example shown in FIG. 5, in response to an example downward movement (from the arm/hand/controller position shown in dotted lines to the arm/hand/controller position shown in solid lines), the system may rely on certain fixed parameters to determine whether it is the user's intention to scale the feature 450 to the scaled feature 450A, or to the scaled feature 450B, or to the scaled feature 450C, which all fall along the virtual target ray 415. This will be explained in more detail with reference to FIGS. 6A-6F.

Figure 6A:
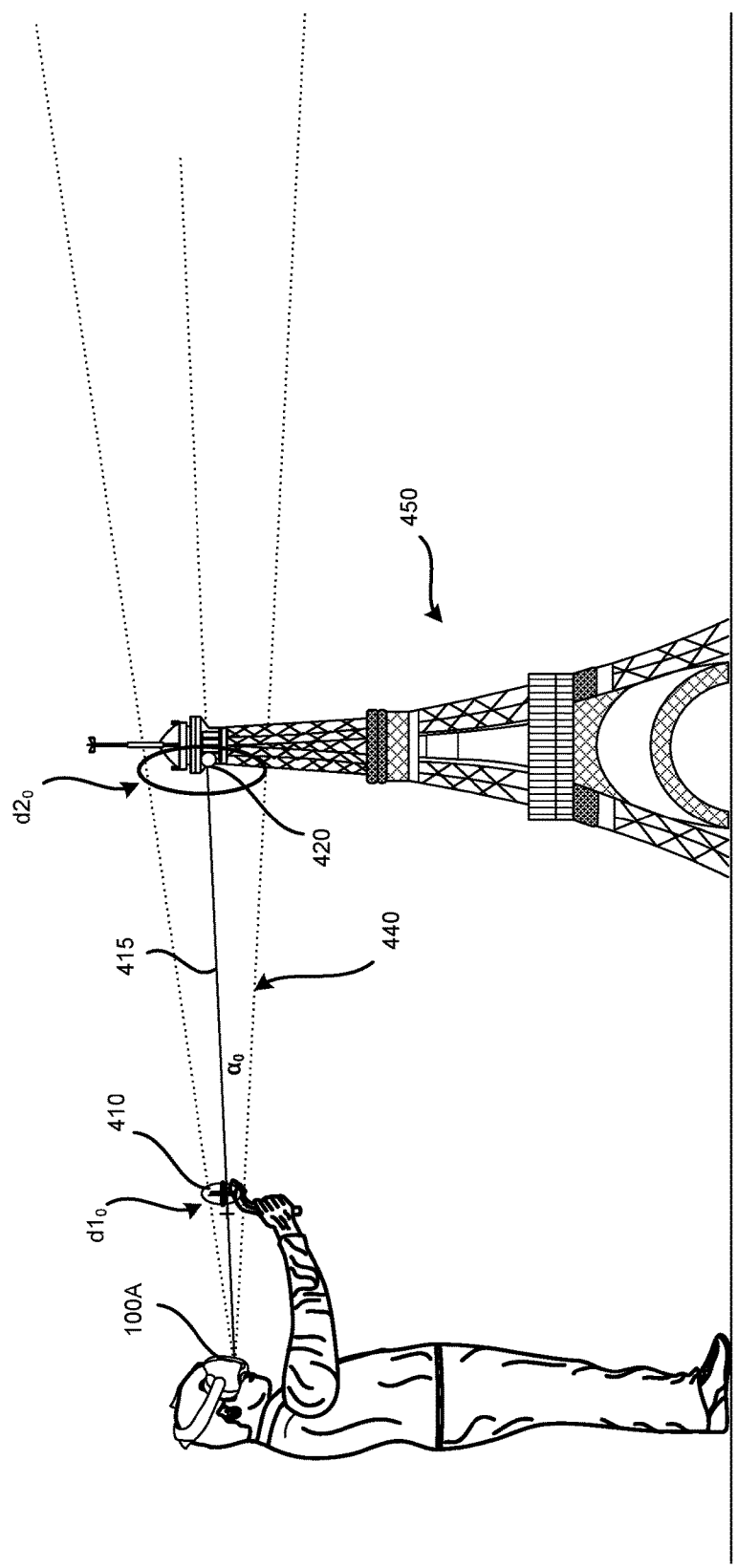

In FIG. 6A, at the start of an interaction with the virtual feature 450 in the virtual environment 400 (for example, at time t=0), the user may be positioned facing the virtual feature 450 on the virtual reference plane 400A, which, hereinafter, will be considered to be the virtual ground 400A. In the example shown in FIG. 6A, at time t=0, the user holds the controller 102 with his arm extended, so that the virtual target ray 415 extends from the user set reference point 100A through the virtual crosshairs 410 to the portion of the selected feature 450 to set the anchor point 420. In some implementations, a size, or dimension(s) (i.e., height and width) of the virtual crosshairs 410 may be constant, and may be set, for example, for a particular application, or by the user, or by the system, and the like. The set dimensions of the virtual crosshairs 410 may define a first disk $d1_0$ at time t=0, the first disk $d1_0$ having a constant radius r1 defined by the set dimensions of the virtual crosshairs 410. An example of what may be viewed by the user shown in FIG. 4A, at the start of the user's interaction with the virtual feature 450, or time t=0, by, for example, manipulating a device on the user interface 104 of the controller 102, such as, for example, depressing a button or trigger, is illustrated in FIG. 6B.

The first disk $d1_0$ may define a cone 440, the cone 440 having an origin at the set user reference point 100A, and extending tangentially to the first disk $d1_0$ towards a plane surrounding the anchor point 420. At time t=0, an angle $\alpha_0$ may be defined as the half-angle of the cone 440 defined by the set user reference point 100A and the first disk $d1_0$. A second disk $d2_0$ having a radius r2 may be defined as the cross section through the cone 440 at a distance corresponding to the anchor point 420, i.e., at a virtual plane, substantially perpendicular to the virtual target ray 415, corresponding to/including the anchor point 420.

Once set as shown in FIG. 6A, the virtual radius r2, relative to the virtual environment 400, may remain fixed, or constant with respect to the virtual environment 400. That is, once set, the portion of the virtual feature 450 captured within the confines of the second disk $d2_0$ having the constant virtual radius r2 relative to the virtual environment 400, as shown in FIG. 6B, may remain the same, while the virtual feature 450, including the portion of the virtual feature 450 captured within the second disk $d2_0$, is translated and/or scaled in response to user movement of the anchor point 420. This will be described in more detail with respect to FIGS. 6C-6F.

Figure 6D:
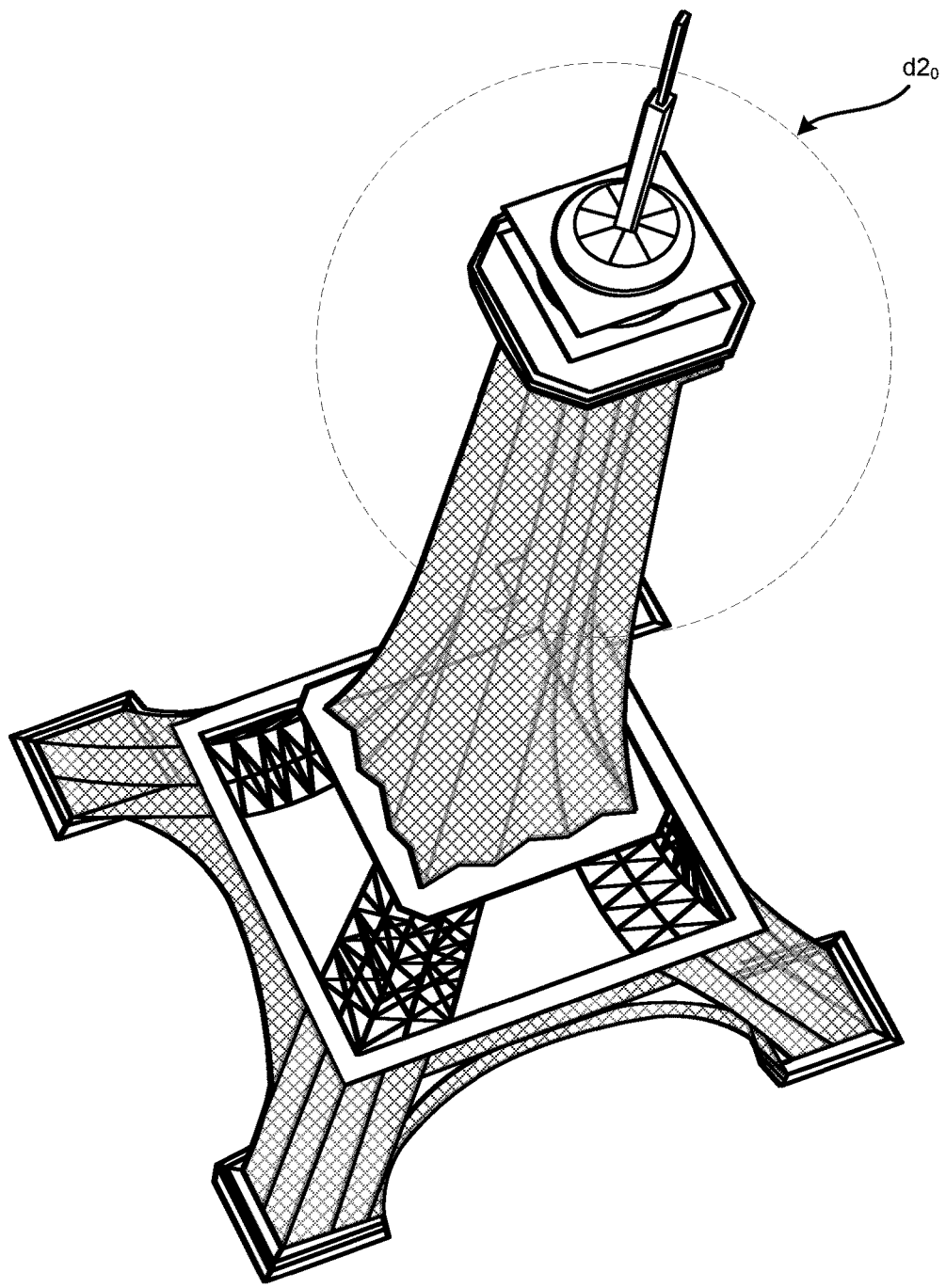
Figure 6E:
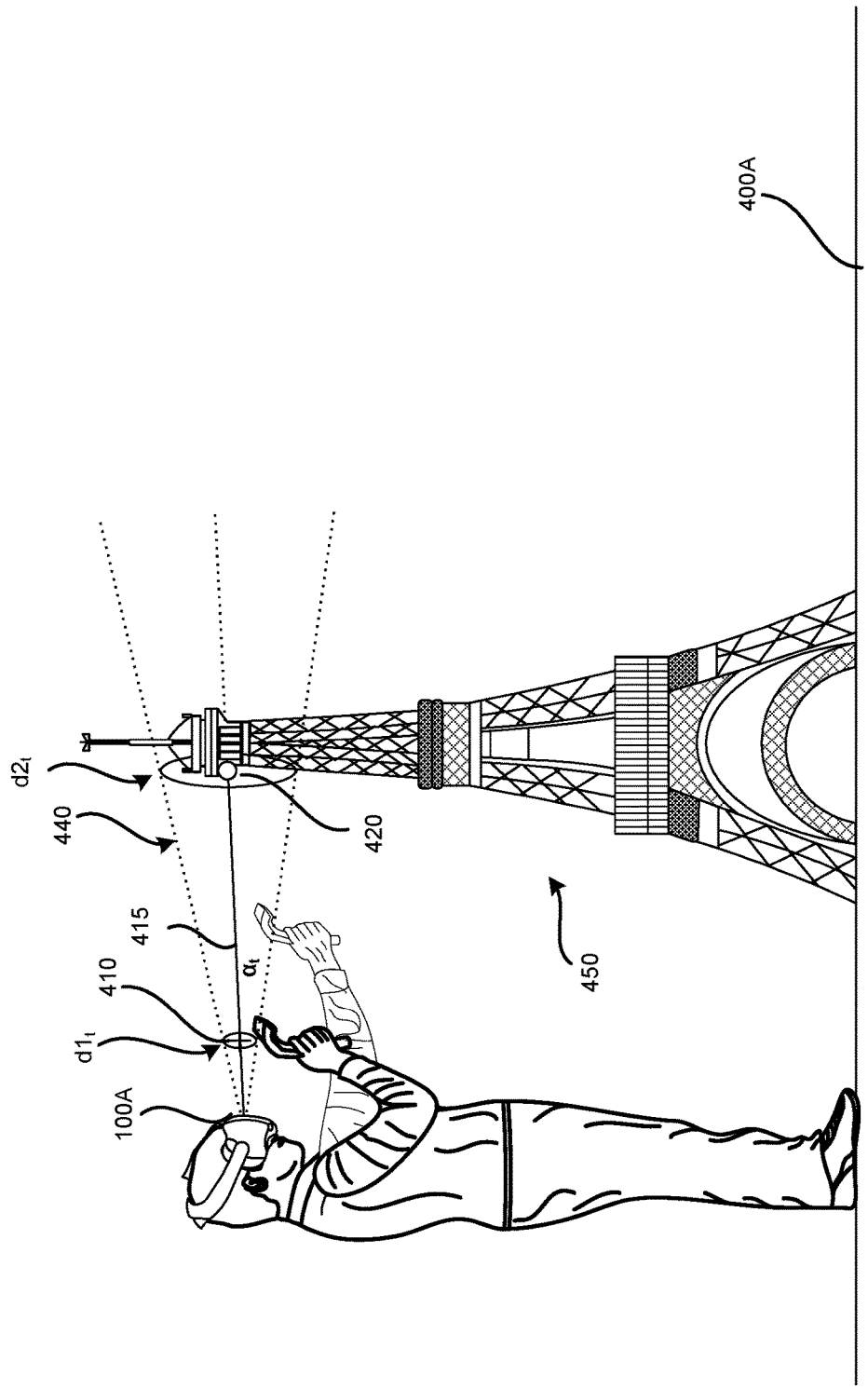
Figure 6F:
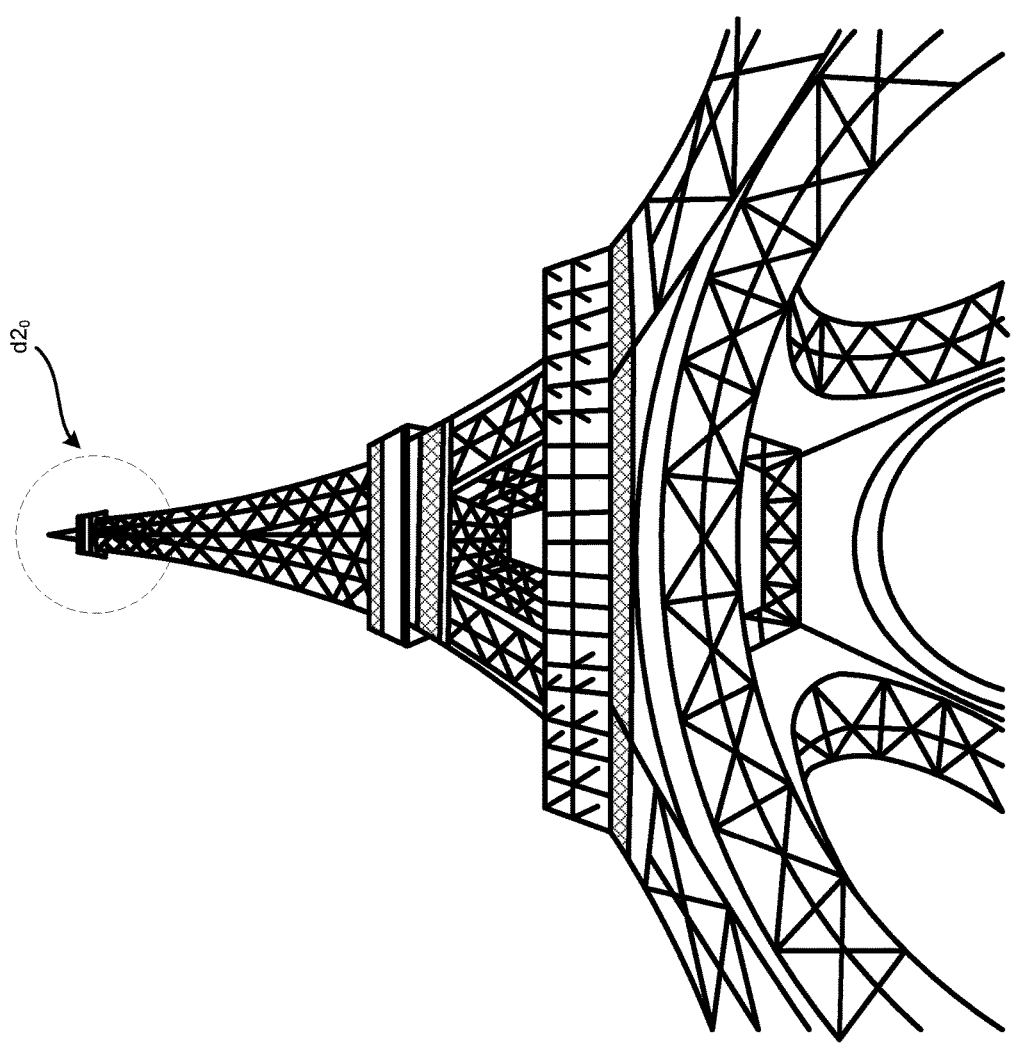

FIG. 6C illustrates a subsequent point in time, t>0, illustrating a downward movement of the virtual target ray 415, corresponding to a downward movement of the anchor point 420 and a scaling down of the virtual feature 450. An example of what may be viewed by the user shown in FIG. 4C, after movement from the position shown in FIG. 6A to the position shown in FIG. 6C (to be described in more detail below), is illustrated in FIG. 6D. FIG. 6E illustrates a subsequent point in time, t>0, illustrating an inward movement of the first disk $d1_t$ closer to the set user reference point 100A, corresponding to a closing in movement of the anchor point 420, and decreasing a perceived virtual distance between the user and the virtual feature 450. An example of what may be viewed by the user shown in FIG. 4E, after movement from the position shown in FIG. 6A to the position shown in FIG. 6E (to be described in more detail below), is illustrated in FIG. 6F.

In each subsequent point in time t>0 (i.e., t1, t2, . . . tN), after setting the anchor point 420 as described above with respect to FIG. 6A, the angle at may be calculated as the half angle of the cone 440 defined by the set user reference point 100A and the first disk d1t. At each subsequent point in time t>0, the radius r1 of the first disk d1t remains constant/fixed (as the dimensions of the virtual crosshairs 410 remain constant) relative to the user. At each subsequent point in time t>0, the virtual radius r2 of the second disk d2t remains constant/fixed relative to the virtual environment 400, as the anchor point 420 moves and remains on the virtual target ray 415. The virtual reference plane 400A, or virtual ground 400A, also remains fixed, or constant, and aligned with the real world ground. However, a distance between the set user reference point 100A and the first disk d1t may change as the user's arm/hand holding the controller 102 moves. This may cause the half angle at to also change at subsequent points in time t>0 (i.e., t1, t2, . . . tN) in response to the user's movement of the anchor point 420 as described above. This recalculation of the half angle at as the anchor point 420 is moved in this manner, while the radius r1 of the first disk d1t remains constant relative to the user and the virtual radius r2 of the second disk d2t remains constant relative to the virtual environment 400, the anchor point 420 remains on the virtual target ray 415, and the virtual reference plane 400A remains aligned with the real world ground, allow the virtual environment to be translated and/or scaled as shown.

In the example shown in FIGS. 6A-6E, the first disk $d1_o/dt_o$, representing an area surrounding the set controller reference point 410, is defined as a disk based on the virtual crosshairs having an intersection point at the set controller reference point 410. This example geometry, in which the area surrounding the set controller reference point 410 has a circular disk shape, and the area surrounding the anchor point 420, and the area surrounding the anchor point 420 has a circular disk shape, defined by the cone, may facilitate the calculation and tracking/adjustment of the half angle α as the user and/or the virtual features are scaled in response to movement of the controller, and may generate reduced processing workload. However, the circular shaped disk is shown simply for ease of discussion and illustration, and the area surrounding the set controller reference point 410 may have other closed curve shapes. Similarly, in the example shown in FIGS. 6A-6E, the cone 440 is defined by geometry originating at the set user reference point 100A and extending tangentially beyond the first disk $d1_o$. However, this geometry may also vary, based on the geometry of the area defined surrounding the set user reference point 410. Similarly, in the example shown in FIGS. 6A-6E, the area surrounding the anchor point 420 is defined as a circular shaped disk. However, the shape of this area surrounding the anchor point 420 will also be defined by the closed curve shape of the area surrounding the set controller reference point and the extension of that geometry to an intersection with a plane of the virtual feature 450.

Figure 7A:
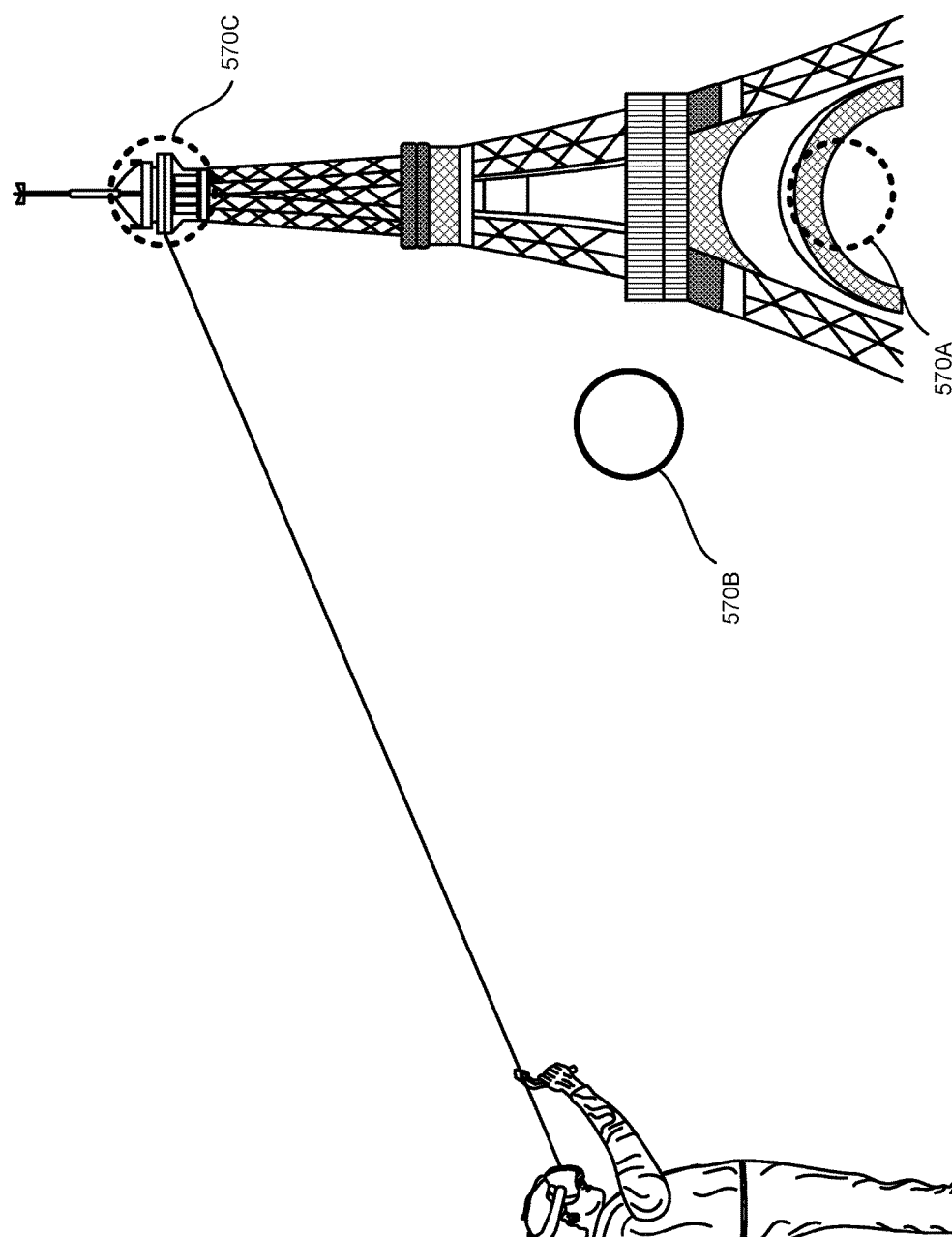

As shown in FIG. 7A, in some implementations, one or more virtual photo spheres 570 (for example, first, second and third virtual photo spheres 570A, 570B, 570C) may be available to the user for selection in the virtual environment. Each photo sphere may provide a 360-degree panoramic experience of, for example, a particular feature, location and the like, in the virtual environment. To move to one of the virtual photospheres 570, the user may, for example, direct the virtual beam 500 generated by the handheld electronic device 102 as described above toward a selected one of the virtual photo spheres 570, such as, for example, the third virtual photo sphere 570C, to move into a 360-degree panoramic experience of an interior of the virtual feature 550, as shown in FIG. 7A. Upon further manipulation of the handheld electronic device 102, for example, release of a button directing the virtual beam 550 to the selected virtual photo sphere 570C, the user may be moved, or teleported, or transported, to the selected virtual photo sphere 570C, as shown in FIG. 7B.

When moving, or transporting, or teleporting to the selected virtual photo sphere 570, the user may also choose to adjust in scale relative to the features in the virtual environment as discussed in detail above. In particular, when moving to the selected virtual photo sphere 570, the user may choose to increase is size/scale, or decrease in size/scale, relative to the virtual elements included in the 360-degree panoramic experience provided by the selected virtual photo sphere 570 in the manner described above in detail.

Once within the virtual photo sphere 570, the user may move within the virtual photo sphere 570. For example, the user may turn to view a different portion of the 360-degree panoramic experience provided by the virtual photo sphere 570, and/or the user may walk from a virtual position C to a virtual position D within the virtual photo sphere 570, as shown in FIG. 8B, to approach, or get closer to, a virtual element included in the 360-degree panoramic experience provided by the virtual photo sphere 570. In some implementations, the user may, for example, walk within the virtual photo sphere 570 to what may be considered an edge of the 360-panoramic virtual display within the virtual photo sphere 570, with the virtual elements displayed in the 360-degree panoramic experience of the virtual photo sphere 570 displayed in front of the user appearing larger as the user walks in the direction of, or approaches, the virtual elements. Similarly, if the user were to turn around, for example, turn 180 degrees after arriving at the virtual position D, the virtual elements that were once behind the user may appear smaller, as the user has walked away from the virtual elements displayed in that portion of the virtual photo sphere 570.

Figure 8:
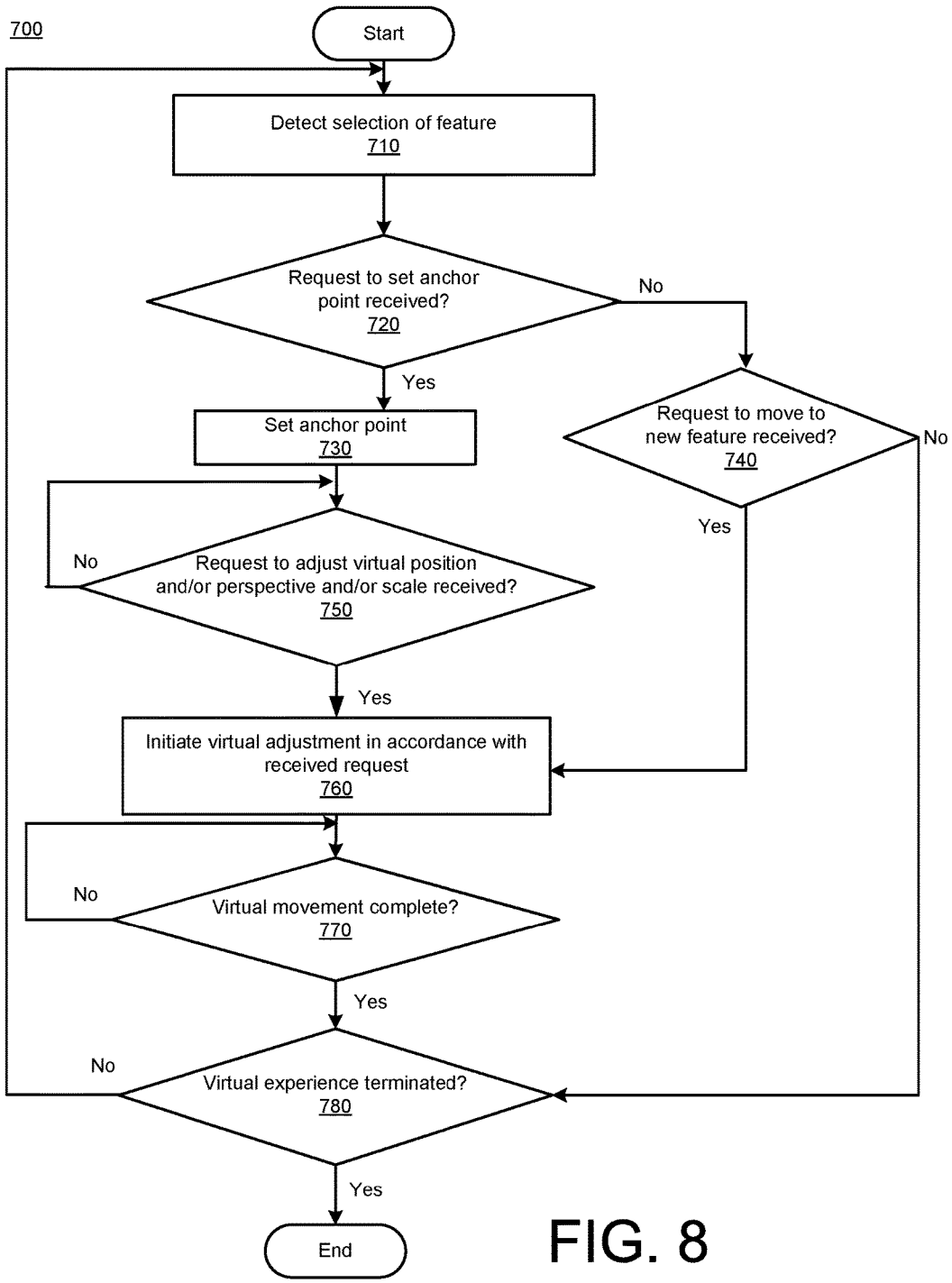
FIG. 8 is a flowchart of a method of navigating and scaling in an augmented and/or virtual reality environment, in accordance with implementations described herein.

A method 700 of navigating and/or scaling in an augmented and/or a virtual reality environment, in accordance with implementations described herein, is shown in FIG. 8. Upon detection of a selection of a virtual feature (block 710), it may be determined whether or not a request to set a virtual anchor point has been received (block 720). The request to set a virtual anchor point may be, for example, input by a user as described above in detail with respect to FIGS. 4A and 6A. If a request to set a virtual anchor point has been received, the virtual anchor point may be set (block 730). If the virtual anchor point is set and a request to adjust a user's position, or view, or perspective, or scale, relative to the virtual environment (or a request to scale the virtual environment relative to the user) is received (block 750), the system may adjust the position and/or view and/or perspective and/or scale in accordance with the received request (block 760), as described above in detail with respect to FIGS. 4B-4F and 6B-6F. If a virtual anchor point has not been set but a request to move or otherwise adjust the user's position relative to the selected virtual feature is received (block 740), the system may carry out the requested adjustment in accordance with the received request (block 760). Upon completion of the requested virtual adjustment (block 770), the process may be repeated until the virtual experience is terminated (block 780).

Figure 9:
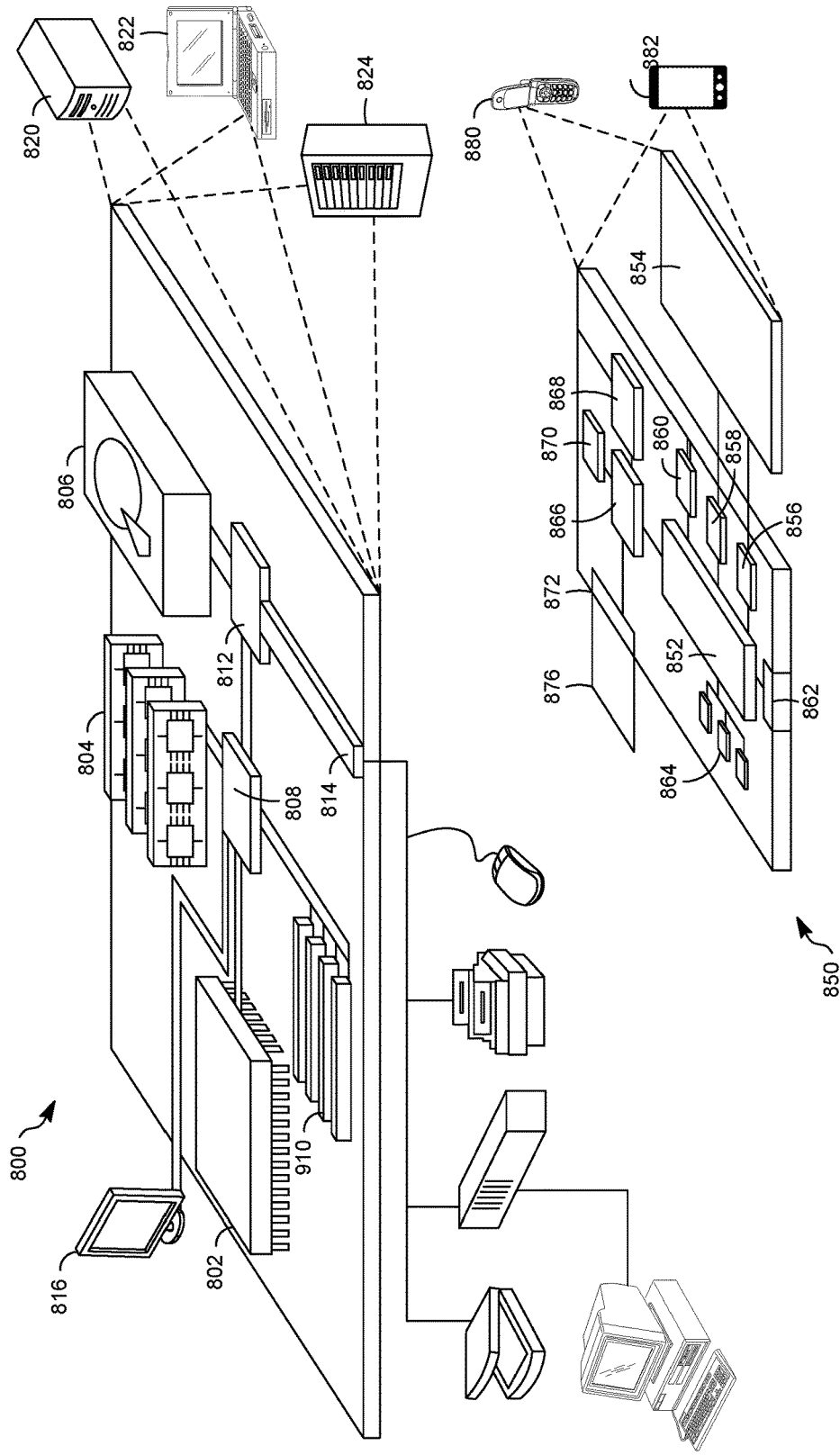
FIG. 9 shows an example of a computer device and a mobile computer device that can be used to implement the techniques described herein.

FIG. 9 shows an example of a generic computer device 800 and a generic mobile computer device 850, which may be used with the techniques described here. Computing device 800 is intended to represent various forms of digital computers, such as laptops, desktops, tablets, workstations, personal digital assistants, televisions, servers, blade servers, mainframes, and other appropriate computing devices. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. The processor 802 can be a semiconductor-based processor. The memory 804 can be a semiconductor-based memory. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process.

A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   generating a virtual environment within a display of a head mounted display device;
   detecting a first input received at a user interface of a handheld controller in communication with the head mounted display device;
   setting an anchor point on a selected virtual feature in the virtual environment in response to the first input;
   detecting a second input; and
   in response to the second input,
   defining an area within the virtual environment that includes the virtual feature associated with the anchor point based on a position of a set controller reference point relative to a set user reference point, wherein the set user reference point corresponds to a fixed point relative to the head mounted display device, and the set controller reference point corresponds to a fixed point relative to the handheld controller, and wherein the set user reference point, the set controller reference point, and the anchor point lie on a virtual line; and
   adjusting at least one of a position or a scale of the virtual feature in the virtual environment while maintaining the defined area within a user field of view of the virtual environment.

2. The method of claim 1, wherein setting the anchor point on the selected virtual feature in the virtual environment in response to the first input includes:
   detecting an intersection of a virtual target ray and the virtual feature; and
   setting the anchor point at the detected intersection of the virtual target ray and the virtual feature.

3. The method of claim 2, wherein the set user reference point corresponds to a fixed point on the head mounted display device, and the set controller reference point corresponds to a fixed point relative to the handheld controller.

4. The method of claim 3, wherein detecting the intersection of the virtual target ray and the virtual feature includes defining the virtual target ray, the virtual target ray having an origin at the set user reference point, and the virtual target ray extending from the origin at the set user reference point through the set controller reference point.

5. The method of claim 4, wherein the set controller reference point defines a center of a virtual closed curve.

6. The method of claim 1, wherein defining the area within the virtual environment that includes the virtual feature associated with the anchor point based on the position of a set controller reference point relative to the set user reference point includes:
   defining a first virtual disk having a center defined by the set controller reference point;
   defining a virtual cone based on the set user reference point and the first virtual disk, the virtual cone having an origin at the set user reference point and extending toward the virtual feature, tangentially contacting the first virtual disk; and
   defining a second virtual disk at the intersection of the virtual cone with the virtual feature.

7. The method of claim 6, wherein defining the first virtual disk having the center defined by the set controller reference point includes defining a first radius of the first virtual disk, the first radius extending from the set controller reference point to a circumference of the first virtual disk, and wherein defining the second virtual disk at the intersection of the cone with the virtual feature includes:

defining a center of the second virtual disk, a center of the second virtual disk corresponding to the anchor point;

defining a circumference of the second virtual disk, the circumference corresponding to the intersection of the cone with a virtual plane located at the anchor point, the anchor point being perpendicular to the virtual target ray; and defining a second radius of the second virtual disk, the second radius extending from the center of second virtual disk to the circumference of the second virtual disk.

8. The method of claim 7, wherein defining the virtual cone based on the set user reference point and the first virtual disk also includes defining a half angle between the virtual target ray and a circumference of the virtual cone.

9. The method of claim 8, wherein the first radius of the first virtual disk remains constant relative to the user and the second virtual radius of the second virtual disk remains constant relative to the virtual environment as the set controller reference point moves with respect to the set user reference point, and the half angle changes as the set controller reference point moves with respect to the set user reference point.

10. The method of claim 8, wherein receiving the second input includes detecting movement of the set controller reference point relative to the set user reference point, and wherein adjusting at least one of the position or the scale of the virtual feature in the virtual environment in response to the second input includes:

maintaining the anchor point on the virtual target ray as the set controller reference point moves with respect to the set user reference point;

maintaining the first radius of the first virtual disk constant relative to the user as the set controller reference point moves with respect to the set user reference point;

maintaining the second radius of the second virtual disk constant relative to the virtual environment as the set controller reference point moves with respect to the set user reference point and the at least one of the position or the scale of the virtual feature is adjusted; and adjusting the half angle as the set controller reference point moves with respect to the set user reference point and the at least one of the position or the scale of the virtual feature is adjusted.

11. The method of claim 8, wherein receiving the second input includes detecting movement of the set controller reference point relative to the set user reference point, and wherein adjusting at least one of the position or the scale of the virtual feature in the virtual environment in response to the second input includes:

maintaining the anchor point on the virtual target ray as the set controller reference point moves with respect to the set user reference point, causing the anchor point to move;

maintaining the portion of the virtual feature in the defined area surrounding the anchor point within the defined area as the anchor point moves; and adjusting the at least one of the position or the scale of the portion of the virtual feature in the defined area surrounding the anchor point as the anchor point moves.

12. The method of claim 11, wherein the defined area of the virtual feature surrounding the anchor point corresponds to the second virtual disk, and wherein the virtual radius of the second virtual disk remains constant with respect to the virtual environment as the at least one of the position or the scale of the virtual feature is adjusted in response to movement of the anchor point.

13. A system, comprising:

a computing device configured to generate an immersive virtual environment, the computing device including:

a memory storing executable instructions; and a processor configured to execute the instructions to cause the computing device to:

generate, within a display of a head mounted display device, a virtual environment;

detect a first input received at a user interface of a handheld controller in communication with the head mounted display device;

set an anchor point on a selected virtual feature in the virtual environment in response to the first input;

detect a second input; and in response to the second input, define an area of the feature such that the anchor point is disposed within the area based on a position of a set controller reference point relative to a set user reference point, wherein the set user reference point corresponds to a fixed point relative to the head mounted display device, and the set controller reference point corresponds to a fixed point relative to the handheld controller, and wherein the set user reference point, the set controller reference point, and the anchor point lie on a virtual line; and adjust at least one of a position or a scale of the virtual feature in the virtual environment, while maintaining the defined area within a user field of view of the virtual environment.

14. The system of claim 13, wherein, in setting the anchor point on the selected virtual feature in the virtual environment in response to the first input, the processor is configured to:

detect an intersection of a virtual target ray and the virtual feature, the virtual target ray being defined based on an origin at a set user reference point corresponding to a fixed point on a user head mounted display, and extending through a set controller reference point corresponding to a fixed point relative to the controller; and set the anchor point at the detected intersection of the virtual target ray and the virtual feature.

15. The system of claim 14, wherein, in defining the area of the feature surrounding the anchor point, the processor is configured to:

define a first virtual disk at the set user controller point;

define a virtual cone based on the set user reference point and the first virtual disk, the virtual cone having an origin at the set user reference point and extending toward the virtual feature, tangentially contacting the first virtual disk; and define a second virtual disk at the intersection of the virtual cone with the virtual feature.

16. The system of claim 15, wherein, in defining the first virtual disk at the pair of virtual crosshairs, the processor is configured to:

define a center of the first virtual disk, the center of the first virtual disk corresponding to the set controller reference point; and define a first radius of the first virtual disk, the first radius extending from the center of the first virtual disk at the set controller reference point to a circumference of the first virtual disk.

17. The system of claim 16, wherein, in defining the second virtual disk at the intersection of the cone with the virtual feature, the processor is configured to:
- define a center of the second virtual disk, the center of the second virtual disk corresponding to the anchor point;
- define a circumference of the second virtual disk, the circumference corresponding to the intersection of the cone with the virtual feature;
- defining a second radius of the second virtual disk, the second radius extending from the center of second virtual disk to the circumference of the second virtual disk; and
- define a half angle between the virtual target ray and a circumference of the virtual cone.

18. The system of claim 17, wherein, in adjusting the at least one of the position or the scale of the virtual feature in the virtual environment in response to the second input, the processor is configured to:
- detect movement of the set controller reference point relative to the set user reference point as the second input;
- maintain the anchor point on the virtual target ray as the set controller reference point moves with respect to the set user reference point;
- maintain the first radius of the first virtual disk constant relative to the user as the set controller reference point moves with respect to the set user reference point;
- maintain the second radius of the second virtual disk constant relative to the virtual environment as the set controller reference point moves with respect to the set user reference point and the at least one of the position or the scale of the virtual feature is adjusted; and
- adjust the half angle as the set controller reference point moves with respect to the set user reference point and the at least one of the position or the scale of the virtual feature is adjusted.

19. The system of claim 17, wherein, in maintaining the second radius of the second virtual disk constant with respect to the virtual environment as the set controller reference point moves with respect to the set user reference point, the processor is configured to:
- maintain the portion of the virtual feature in the defined area surrounding the anchor point within the defined area as the anchor point moves; and
- adjust the at least one of the position or the scale of the portion of the virtual feature in the defined area surrounding the anchor point as the anchor point moves together with the adjustment of the at least one of the position or the scale of the virtual feature.

20. The system of claim 19, wherein the defined area of the virtual feature surrounding the anchor point corresponds to the second virtual disk, and wherein the virtual radius of the second virtual disk remains constant with respect to the virtual environment as the at least one of the position or the scale of the virtual feature is adjusted in response to movement of the anchor point.

* * * * *